(12) United States Patent
Cohen

(10) Patent No.: US 12,734,592 B1
(45) Date of Patent: Sep. 15, 2026

(54) HOLE SAW COMBINED WITH ANNULAR RABBET MAKER

(71) Applicant: AMP Plus, Inc., Vernon, CA (US)

(72) Inventor: Brandon Cohen, Vernon, CA (US)

(73) Assignee: AMP Plus, Inc., Vernon, CA (US)

( * ) Notice: Subject to any disclaimer, the term of this patent is extended or adjusted under 35 U.S.C. 154(b) by 132 days.

(21) Appl. No.: 18/597,114

(22) Filed: Mar. 6, 2024

(51) Int. Cl.
*B23B 41/02* (2006.01)
*B23B 51/04* (2006.01)

(52) U.S. Cl.
CPC .......... *B23B 51/04* (2013.01); *B23B 2226/57* (2013.01)

(58) Field of Classification Search
CPC ............................ B23B 51/04; B23B 2226/57
See application file for complete search history.

(56) References Cited

U.S. PATENT DOCUMENTS 1,133,535 A 3/1915 Cain
1,471,340 A 10/1923 Knight
1,856,356 A 5/1932 Owen
2,352,913 A 7/1944 Parker
2,758,810 A 8/1956 Good
2,802,933 A 8/1957 Broadwin
3,104,087 A 9/1963 Budnick
3,773,968 A 11/1973 Copp
3,913,773 A 10/1975 Copp
4,880,128 A 11/1989 Jorgensen
4,919,292 A 4/1990 Hsu
5,303,894 A 4/1994 Deschamps
5,420,376 A 5/1995 Rajecki
5,931,432 A 8/1999 Herold
5,957,573 A 9/1999 Wedekind
6,521,833 B1 2/2003 DeFreitas
6,967,284 B1 11/2005 Gretz
7,784,754 B2 8/2010 Nevers
(Continued)

FOREIGN PATENT DOCUMENTS

DE 19843849 A1 * 3/2000 ......... B23B 51/0473
EP 3521688 A1 7/2019
(Continued)

OTHER PUBLICATIONS

US 10,816,169 B1, 10/2020, Danesh (withdrawn)
(Continued)

*Primary Examiner* — Omar Flores Sanchez
(74) *Attorney, Agent, or Firm* — Eric Kelly

(57) ABSTRACT

A tool that is removably attachable to a common handheld drill (or impact driver) generates a through-hole in a section of drywall and also removes some drywall-material around a circumference of the through-hole in the drywall, resulting in an annular rabbet in the section of drywall directly around the through-hole. This tool may include a hole-saw and a rabbet-making-means that are connected to each other. At least some of the rabbet-making-means radially surrounds an outermost diameter of the hole-saw. The hole-saw generates the through-hole (in the drywall). The rabbet-making-means generates the annular rabbet. A flange of a spackle frame is inlaid within the annular rabbet in the drywall such that a bottom exterior surface of the drywall is flush with at least some of a bottom exterior surface of the flange. Spackle frames are used in trimless (trim-less) pot (recessed) lighting installs, particularly in ceilings.

19 Claims, 24 Drawing Sheets

(56) References Cited

U.S. PATENT DOCUMENTS 7,857,275 B2 12/2010 de la Borbolla
7,950,832 B2 * 5/2011 Tanaka .................. H05B 45/22 362/803
8,235,549 B2 8/2012 Gingrich, III
8,322,897 B2 12/2012 Blincoe
8,545,064 B2 10/2013 Blincoe
8,680,755 B2 3/2014 Lim
8,827,604 B1 * 9/2014 Corey ................ B23B 51/0453 408/239 R
8,845,144 B1 9/2014 Davis
8,926,133 B2 1/2015 Booth
9,039,254 B2 5/2015 Danesh
9,151,457 B2 10/2015 Pickard
9,404,639 B2 8/2016 Bailey
9,523,493 B2 12/2016 Chen
9,605,842 B1 3/2017 Davis
9,673,597 B2 6/2017 Lee
9,696,021 B2 7/2017 Wronski
9,797,562 B2 10/2017 Dabiet
9,854,642 B2 12/2017 Kashani
9,890,942 B2 2/2018 Lin
9,945,548 B2 4/2018 Williams
9,964,266 B2 5/2018 Danesh
10,072,805 B2 9/2018 Bailey
D832,218 S 10/2018 Wronski
D833,977 S 11/2018 Danesh
10,125,958 B1 11/2018 Wronski
10,139,059 B2 11/2018 Danesh
10,244,607 B1 3/2019 Kashani
D847,414 S 4/2019 Danesh
D847,415 S 4/2019 Danesh
10,247,390 B1 4/2019 Kopitzke
D848,375 S 5/2019 Danesh
D851,046 S 6/2019 Peng
10,378,738 B1 8/2019 Davis
10,408,395 B2 9/2019 Danesh
10,408,396 B2 9/2019 Wronski
D864,877 S 10/2019 Danesh
10,488,000 B2 11/2019 Danesh
10,493,537 B2 * 12/2019 Sirch .................. B23B 51/0426
10,551,044 B2 2/2020 Peng
10,563,850 B2 2/2020 Danesh
D877,957 S 3/2020 Kopitzke
10,591,120 B2 3/2020 Bailey
10,609,785 B1 3/2020 Fardadi
10,616,968 B2 4/2020 Wang
10,663,127 B2 5/2020 Danesh
10,663,153 B2 5/2020 Nikooyan
10,753,558 B2 8/2020 Danesh
10,805,997 B2 10/2020 Wang
10,816,148 B2 10/2020 Danesh
D901,398 S 11/2020 Danesh
D902,871 S 11/2020 Danesh
D903,605 S 12/2020 Danesh
D905,327 S 12/2020 Williams
D907,284 S 1/2021 Danesh
10,975,570 B2 4/2021 Shen
10,982,829 B2 4/2021 Danesh
10,989,390 B2 4/2021 Lotfi
11,022,259 B2 6/2021 Bailey
11,028,982 B2 6/2021 Danesh
11,047,538 B2 6/2021 Danesh
D924,467 S 7/2021 Danesh
D925,109 S 7/2021 Danesh
11,060,705 B1 7/2021 Danesh
11,067,231 B2 7/2021 Lotfi
11,085,597 B2 8/2021 Danesh
11,118,768 B2 9/2021 Danesh
11,662,084 B2 5/2023 Cohen
2002/0094246 A1 * 7/2002 Jones ................. B23B 51/0426 408/206
2007/0006548 A1 * 1/2007 Trudeau ............. E04G 23/0203 52/749.1
2014/0254177 A1 9/2014 Danesh
2015/0009676 A1 1/2015 Danesh
2015/0233556 A1 8/2015 Danesh
2015/0276185 A1 10/2015 Bailey
2016/0273235 A1 * 9/2016 Davidian ............ E04G 23/0207
2016/0312987 A1 10/2016 Danesh
2016/0348860 A1 12/2016 Bailey
2016/0348861 A1 12/2016 Bailey
2017/0005460 A1 1/2017 Lee
2017/0009963 A1 1/2017 Germain
2017/0045213 A1 2/2017 Williams
2017/0051880 A1 2/2017 Joye
2017/0138576 A1 5/2017 Peng
2017/0167672 A1 6/2017 Stauner
2017/0167699 A1 6/2017 Schubert
2017/0191278 A1 * 7/2017 Celi .................... E04G 23/0207
2017/0290129 A1 10/2017 Kashani
2018/0216809 A1 8/2018 Cohen
2018/0224095 A1 8/2018 Cohen
2018/0231197 A1 8/2018 Danesh
2018/0372283 A1 12/2018 Zeng
2018/0372284 A1 12/2018 Danesh
2019/0049080 A1 2/2019 Danesh
2019/0063701 A1 2/2019 Lotfi
2019/0093836 A1 3/2019 Danesh
2019/0360666 A1 11/2019 Bowen
2019/0394849 A1 12/2019 Wang
2020/0056752 A1 2/2020 Danesh
2020/0116340 A1 4/2020 Nikooyan
2020/0158302 A1 5/2020 Danesh
2020/0232624 A1 7/2020 Lotfi
2020/0236755 A1 7/2020 Wang
2020/0291652 A1 9/2020 Shen
2020/0348000 A1 11/2020 Bailey
2020/0378581 A1 12/2020 Cheng
2020/0386375 A1 12/2020 Danesh
2020/0393118 A1 12/2020 Danesh
2021/0003269 A1 1/2021 Wang
2021/0010647 A1 1/2021 Danesh
2021/0010663 A1 1/2021 Nikooyan
2021/0033268 A1 2/2021 Danesh
2021/0041070 A1 2/2021 Danesh
2021/0071836 A1 3/2021 Danesh
2021/0080084 A1 3/2021 Danesh
2021/0262650 A1 8/2021 Danesh
2022/0010916 A1 1/2022 Magruder
2023/0356306 A1 * 11/2023 Mateer ...................... B27B 5/12

FOREIGN PATENT DOCUMENTS

ES 2505415 A1 10/2014
JP 2014216161 A 11/2014
KR 100735128 B1 7/2007
KR 20140043220 A 4/2014
WO WO-0056491 A1 * 9/2000 ......... B23B 51/0473
WO WO2010051985 A1 5/2010
WO WO2018237294 A2 12/2018
WO WO2018237294 A3 12/2018
WO WO2019046310 A1 3/2019
WO WO2019133669 A1 7/2019
WO WO2019222259 A1 11/2019
WO WO2019241198 A1 12/2019
WO WO2021051101 A1 3/2021
WO WO-2024239113 A1 * 11/2024 ......... B23B 51/0411

OTHER PUBLICATIONS

US 10,969,069 B2, 04/2021, Danesh (withdrawn)
DMF DRD2 Product Publicly available at least as early as Sep. 6, 2018 Website: https://www.dmflighting.com/product/drd2/.
DMF DRD4 Product Publicly available at least as early as Sep. 6, 2018 Website: https://www.dmflighting.com/product/drd4/.
ELCO E247 Product Publicly available at least as early as Sep. 6, 2018 See attached concurrently filed NPL document with two product images of this ELCO E247 Product.
IMTRA Tide PowerLED Light Fixture See: https://www.imtra.com/1806fa8d-4593-40f4-bbf0-f9a833e92148/lighting-light-fixtures-detail.htm Publicly available at least as early as 2012.

(56) References Cited

OTHER PUBLICATIONS

ELCO 4" Round LED Reflector Insert Publicly available at least as early as Mar. 23, 2021 Website: https://elcolighting.com/products/4-round-led-reflector-insert.
ELCO 4" Five-Color Temperature Switch LED Reflector Inserts Publicly available at least as early as Mar. 23, 2021 Website: https://elcolighting.com/node/1432026.
MaxLite Publicly available at least as early as Mar. 23, 2021 Website: https://www.maxlite.com/news-and-events/2021/02/05/maxlite-introduces-canless-commercial-downlights-with-field-selectable-wattages-and-ccts/ And.
Soraa Vivid MR16—GU10; https://www.soraa.com/products/19-MR16-GU10.php (last visited Nov. 9, 2021).
NORA Lighting NIO-TLSUCTION suction cup to assist with removing trimless reflector from finished ceiling. https://noralighting.com/product/nio-tlsuction/ (last visited on Sep. 21, 2021).
DMF Lighting OneFrame Flangeless Trim DRD2TRJDSWHFL Installation. https://vimeo.com/169758683 (last visited on Sep. 21, 2021).
WAC Lighting, Aether 3.5: Trimless Downlight Round https://www.waclighting.com/product/aether-3-5-5/ (last visited on Sep. 21, 2021).
Tech Lighting, flangeless trims, and flangeless installation http://www.element-lighting.com/Products/Details/ENTRA-3-LED-Adjustable-Downlight (last visited on Sep. 21, 2021).
Creative Systems Lighting, round trimless (p. 2) and square trimless (p. 4) https://cdn.hvlgroup.com/csl/pdf/line-drawing/A3-4_linedwg.pdf (last visited on Sep. 21, 2021)).
Creative Systems Lighting, Acrobat 3in Adjustable Reflector Round Trimless Trim https://csllighting.com/Product/A3-4RWH (last visited Sep. 21, 2021).
Fusion Lighting by Elite Lighting, round trimless and square trimless https://media.iuseelite.com/specsheet2/er3-led-ic.pdf (last visited Sep. 21, 2021).

* cited by examiner

HOLE SAW COMBINED WITH ANNULAR RABBET MAKER

TECHNICAL FIELD OF THE INVENTION

The present invention relates in general to means for forming holes in drywall (or the like) for a purpose of installing lighting without a visible flange on an exterior surface of the drywall (or the like) and more specifically to hole saws with integral annular rabbet makers for a purpose of installing lighting without a visible flange on an exterior surface of the drywall (or the like) such that an exterior surface of an installed flangeless trim member (spackle frame) is at least substantially flush with the exterior surface of the drywall (or the like).

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

A pot light or ceiling recessed light may be installed in a ceiling line (plane), such that at least most of the lighting mechanisms (e.g., junction boxes, wiring, drivers, transformers, circuits, housings, and/or the like) may be hidden from view, with respect to an observer located below that given ceiling, except for possibly a lens, reflector, and/or the element that actually generates the light, portions of which may be viewable to the below located observer. Pot light or ceiling recessed light is very common in the ceilings of residential rooms, such as, but not limited to, kitchens, pantries, hallways, living rooms, family rooms, great rooms, media rooms, dining rooms, salons, game rooms, bedrooms, bathrooms, mud rooms, and/or the like. Pot light or ceiling recessed light are also common in rooms of commercial and/or business buildings. The ceilings may be horizontal or at an angle off of horizontal. Of course, such a pot light or recessed ceiling light may also be installed in a wall. Pot lights or ceiling recessed lights are commonly installed into already installed (hung) drywall (sheetrock) within the given building, which may be ceiling drywall and/or wall drywall. Such a pot light or a ceiling recessed light install, may be with a can (hidden on the other side of the drywall) or canless (without a can). A "can" in this context may be an electrical junction box configured for use with a lighting module.

Such a pot light or a ceiling recessed light install, may be with trim or trimless (trim-less) (without visible trim). "Trim" in this context may refer to an annular ring of material that is located below a bottom exterior surface of the (ceiling) drywall and that surrounds the reflector and lens (if any) of the lighting module that is installed above that given section of drywall. Emitted light (from the light generating means typically exits and/or shines down through the volume of air space that the annular material of the trim surrounds.

For at least some pot light or ceiling recessed light installs, a trimless aesthetic may be desired, called for, needed, and/or used. In such installs, the traditional trim member is omitted. And instead, such trimless installs typically use some form of a "spackle frame." Spackle frames have a generally large outside flange region that gets mudded over (e.g., with joint compound and/or spackle) when the given spackle frame gets installed to given section of drywall. However, traditionally, i.e., in the prior art, when a given spackle frame gets installed into a given section of drywall, the flange portion of that installed spackle frame abuts and rests directly on top of a bottom exterior surface of that section of the drywall, such that the bottom exterior surface of that section of the drywall and the bottom exterior surface of that flange are not flush with each other. Thus, when the joint compound (and/or spackle) is smoothed over the flange portion of the spackle frame and the adjoining bottom exterior surface of that section of the drywall, an undesirable visible lump (or hump) of joint compound (and/or spackle) is created. This undesirable visible lump (or hump) problem is shown in prior art FIG. 1D.

It would be desirable if a through-hole within a given section of drywall that is intended for use in a pot light or in a ceiling recessed light install, had an annular rabbet located around that through-hole, so that the flange of a spackle frame may be inlaid within that annular rabbet such that the bottom exterior surface of that section of the drywall and a bottom exterior surface of that inlaid installed flange are flush with each other to eliminate this visibly undesirable lump (or hump).

Further, would be desirable if the through-hole making means in the section of the drywall, had an integral, combined, and/or attached means for making the annular rabbet.

There is a need in the art for a tool, particularly, a tool that is a hole saw combined with an annular rabbet maker; wherein, such a tool may be removably attached to handheld drill (or impact driver).

It is to these ends that the present invention has been developed.

BRIEF SUMMARY OF THE INVENTION

To minimize the limitations in the prior art, and to minimize other limitations that will be apparent upon reading and understanding the present specification, various embodiments of the present invention may describe a tool, also referred to herein as a hole-saw-with-annular-rabbet-maker, that may be removably attachable to a common handheld drill (or impact driver) (e.g., via a chuck of the drill/impact driver), wherein that tool may be configured to generate a through-hole in a section of drywall and wherein that tool may also be configured to remove (excavate) some drywall-material around a circumference of the through-hole in the section of the drywall, resulting in an annular rabbet in the section of drywall directly around the through-hole. In some embodiments, this tool (hole-saw-with-annular-rabbet-maker) may comprise a hole-saw (subassembly) and a rabbet-making-means (subassembly) that are connected to each other. In some embodiments, at least some of the rabbet-making-means may (entirely) radially surround an outermost diameter of the hole-saw. In some embodiments, the hole-saw may also be located on top of some portion of the rabbet-making-means. The hole-saw (subassembly) generates the through-hole (in the drywall). The rabbet-making-means (subassembly) generates the annular rabbet in the drywall and immediately (directly) around a circumference of that through-hole (in the drywall). And at least one purpose of creating such a through-hole with its directly (immediately) associated annular-rabbet is so that a flange of a spackle frame may be inlaid (installed) within the annular rabbet in the section of the drywall, such that a bottom exterior surface of the section of the drywall is flush with at least some of a bottom exterior surface of the flange (of the spackle frame). Spackle frames are used in trimless (trim-less) pot (recessed) lighting installs, particularly in ceilings (but may also be used in a wall install). And the prior art method of using a spackle frame, had no annular-rabbet, such that the flange of the spackle frame instead rested on top of the bottom exterior surface of the drywall, which when mudded over with joint compound created a lump or hump of joint compound material over the flange as compared to joint compound material over just the bottom exterior surface of the drywall. Use of the inventive tool (hole-saw-with-annular-rabbet-maker) avoids this lump or hump by creating the annular-rabbet so that instead the flange of the spackle frame may be flushly inlaid.

It is an objective of the present invention to provide a tool that both generates a through-hole in a section of drywall and that also generates an annular-rabbet directly around a circumference of that through-hole.

It is another objective of the present invention to provide a tool, a hole-saw-with-annular-rabbet-maker, that both generates a through-hole in a section of drywall and that also generates an annular-rabbet directly around a circumference of that through-hole.

It is another objective of the present invention that the annular-rabbet in the section of the drywall, made by the hole-saw-with-annular-rabbet-maker, is configured to fit a flange of a spackle frame within that annular-rabbet.

It is another objective of the present invention that the flange of the spackle frame is installed in an inlaid manner within the annular-rabbet in the section of the drywall such that a bottom exterior surface of the section of the drywall and a bottom exterior surface of the installed flange are flush (even) with each other.

It is another objective of the present invention that a given (same) hole-saw-with-annular-rabbet-maker may be used on a variety of drywalls with different thicknesses.

It is another objective of the present invention that the hole-saw-with-annular-rabbet-maker is removably attachable to a chuck of a standard handheld drill or impact driver.

It is another objective of the present invention that the hole-saw-with-annular-rabbet-maker is quick and easy to use.

It is another objective of the present invention that the hole-saw-with-annular-rabbet-maker is relatively inexpensive to manufacture.

It is another objective of the present invention that the hole-saw-with-annular-rabbet-maker is easy to manufacture.

It is another objective of the present invention that the hole-saw-with-annular-rabbet-maker is manufactured from readily available manufacturing techniques and materials.

It is yet another objective of the present invention that the hole-saw-with-annular-rabbet-maker is easy to mass produce.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 1A is prior art.

FIG. 1B is prior art.

FIG. 1C is prior art.

FIG. 1D is prior art.

FIG. 1E is prior art.

REFERENCE NUMERAL SCHEDULE

Figure 1A:
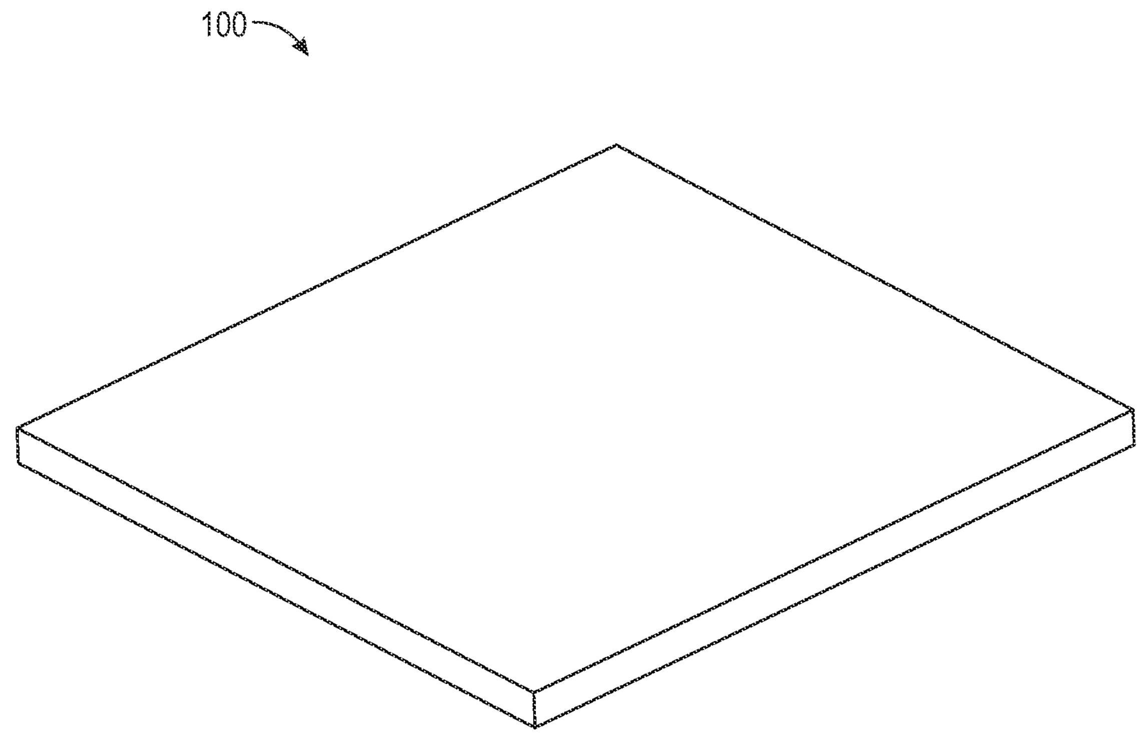
FIG. 1A shows a bottom perspective view of a section of drywall.

100 section of drywall (sheet rock) 100
110 through-hole (in drywall/sheetrock) 110
111 diameter of through-hole 111
120 spackle-frame 120
121 flange 121
130 prior art hole saw 130
200 hole-saw-with-annular-rabbet-maker (or tool) 200
201 hole-saw 201
203 first-circular-base (smaller-circular-base) 203
205 cylindrical-sidewall 205
207 hole-cutting-means 207
209 slot(s)/aperture(s) 209
211 fastener-aperture 211
213 fastener 213
215 positioning-drill-bit (centering-drill-bit) 215
217 discharge-spring 217
251 rabbet-making-means (rabbet-excavating-means) 251
253 second-circular-base (largest-circular-base) 253
255 outermost-cylindrical-sidewall 255
257 outermost-cutting-means 257
259 interior-rabbet-making-means 259
**259*a* innermost-interior-rabbet-making-means 259*a***
**259*b* middle-interior-rabbet-making-means 259*b***
**259*c* outermost-interior-rabbet-making-means 259*c***
261 guide-wheel (freely rotatable wheeled portion) 261
263 housing-for-pin 263
265 fastener-with-pin-for-wheel/bearing 265
267 fastener-for-housing 267
271 collar 271
275 arbor (shaft or shank) 275
299 common-rotational-axis 299
461 guide-wheel-assembly 461
465 bearing 465
467 aperture-for-fastener 467
500 rabbet (annular-rabbet) 500
501 depth-of-rabbet 501
502 diameter-of-rabbet 502
600 exterior-surface (of drywall/sheet rock) 600
700 spackle-frame 700
701 flange 701
703 cylindrical-side-wall 703
859 interior-rabbet-making-means 859
900 prior art (handheld) drill or impact driver 900
901 chuck 901

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1A shows a bottom perspective view of a section of drywall 100. FIG. 1A is prior art. Drywall 100 may also be known and/or referred to as sheetrock, gypsum board, wall board, and/or the like. Drywall 100 may generally be configured in rectangular prism shapes (that may be cut down to desired sizes) that fastened to structural members in a building, such as, but not limited to studs (whether wood, metal, or other). The rectangular prism shape of a given section (piece) of drywall 100 may have gypsum core that is immediately surrounded by one or more layers of backing paper on its main planar surfaces, and wherein an outer most layer of back paper may be covered in at least one layer of face paper. The exterior facing surface of face paper of a given section of installed drywall 100, that faces the interior of a building's room, may be at least partially covered in joint compound, drywall tape, textured, primed and/or painted. A given sheen of commercially available drywall in the U.S. typically comes in non-variable sheets of four (4) feet (ft) by eight (8) ft or four (4) ft by twelve (12) ft; and in non-variable thickness of ¼ inch (in), ⅜ in, ½ in, or ⅝ in, and with ⅝ in thickness often being used where a minimum fire resistance rating is desired or required. Also, drywall 100 is often relatively easy to cut, often merely scoring or cutting through the papers of one planar side is all that is needed as the gypsum core often breaks and fractures along that score/cut line with a minimum of applied force.

The section of drywall 100 shown in FIG. 1A may be a section of ceiling drywall that is facing an interior of a given room within a building. Or, the section of drywall 100 shown in FIG. 1A may be a section of wall drywall that is facing an interior of a given room within a building.

Figure 1B:
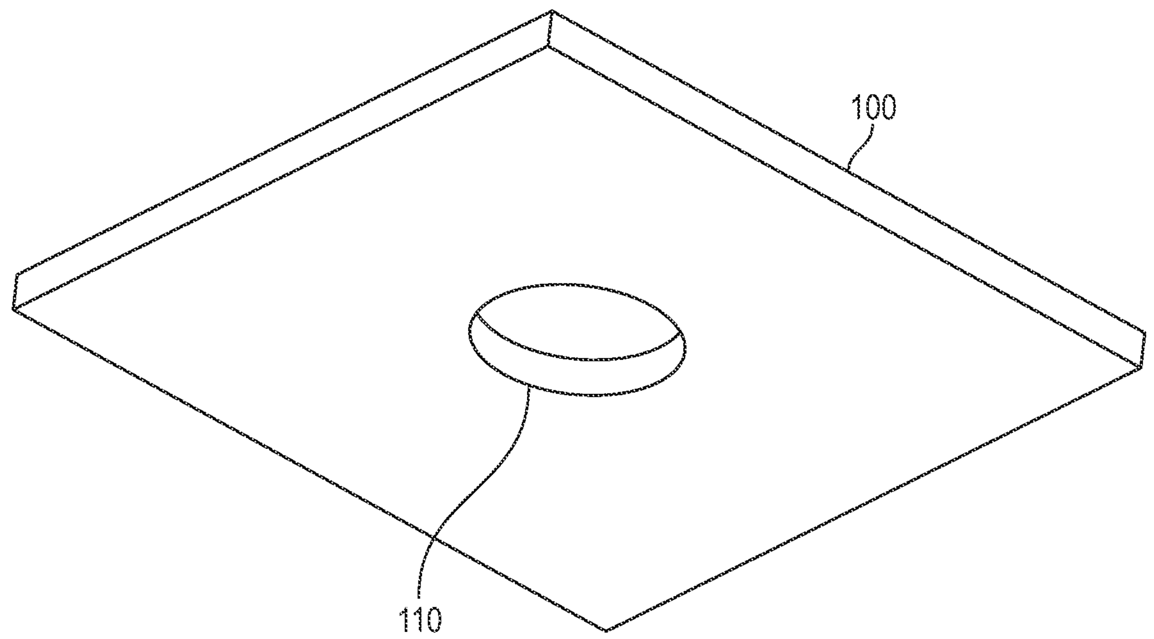
FIG. 1B shows a bottom perspective view of a section of drywall with a through-hole that passes entirely through that section of drywall.

FIG. 1B shows a bottom perspective view of a section of drywall 100 with a through-hole 110 that passes entirely through that section of drywall 100. FIG. 1B is prior art. Through-hole 110 may have been generated via a generic and/or typical hole saw, such as, but not limited to hole saw 130 shown in FIG. 1F. Through-hole 110 may pass entirely through a thickness of drywall 100. Through holes, like through-hole 110, have traditionally been made in drywall 100 for a purpose of installing lighting in a drywall ceiling. A given through-hole 110 will have a fixed, non-variable, and finite diameter, generally determined by the cutting means used to generate the given through-hole 110, such as, an outside diameter of hole saw 130.

Figure 1C:
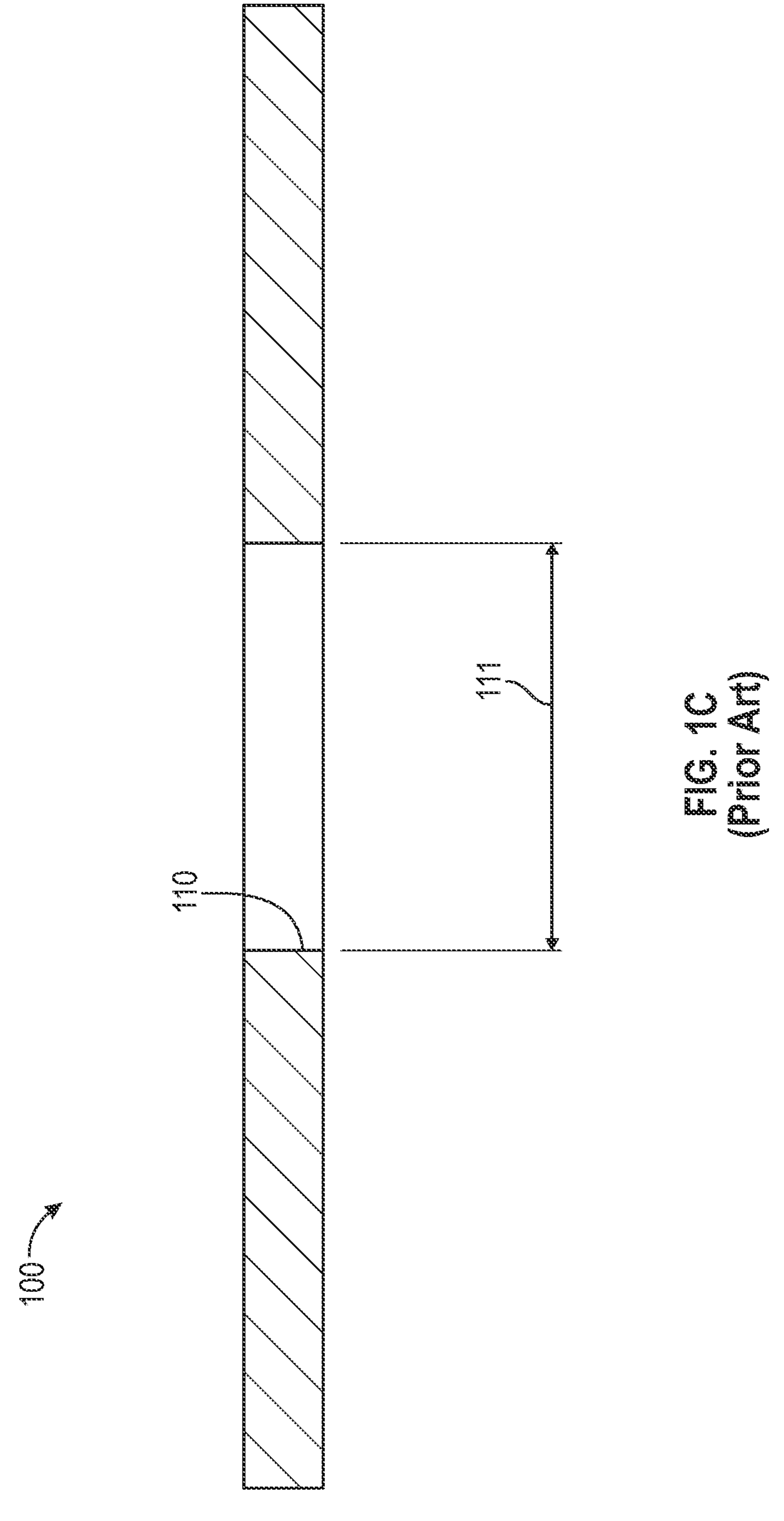
FIG. 1C shows a cross-sectional view through of a section of drywall with a through-hole that passes entirely through that section of drywall.

FIG. 1C shows a cross-sectional view through of a section of drywall 100 with a through-hole 110 that passes entirely through that section of drywall 100. FIG. 1C is prior art. FIG. 1C may be a cross-section through FIG. 1B. Diameter 111 is a diameter of through-hole 110. Diameter 111 of through-hole 110 is shown and called out in FIG. 1C (and in FIG. 1D).

Figure 1D:
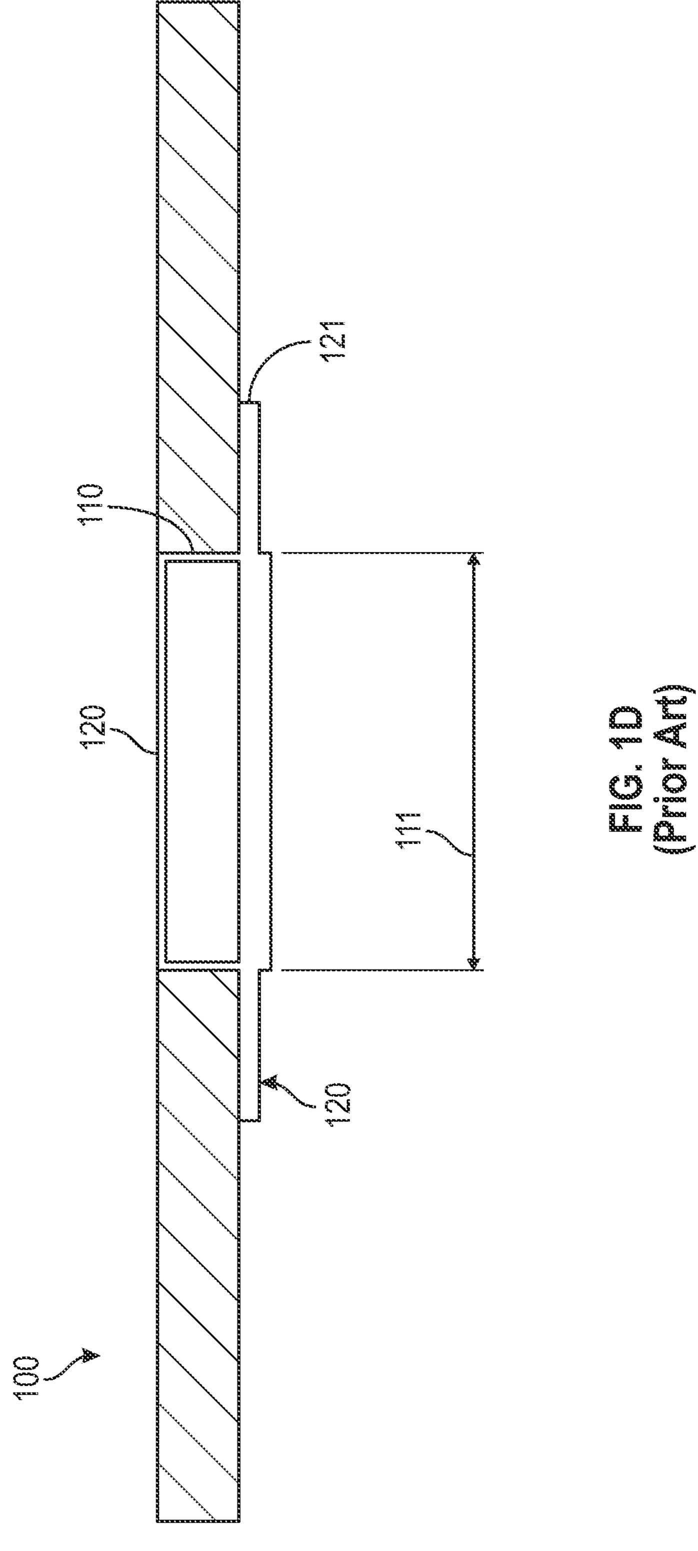
FIG. 1D shows a cross-sectional view through of a section of drywall with a through-hole that passes entirely through that section of drywall; and showing a spackle-frame (flangeless trim member) installed within that through-hole.

FIG. 1D shows a cross-sectional view through of a section of drywall 100 with a through-hole 110 that passes entirely through that section of drywall 100; and showing a spackle-frame 120 (flangeless trim member) installed within that through-hole 110. FIG. 1D is prior art.

It is often desirable to install lighting into ceilings and creating a through-hole 110 into the given section of drywall 100 is often a necessary step (both for access in installing the lighting means and so that the installed lighting means can emit light into the given room). Further, it may be desirable for the installed ceiling light to not have a visible flange trim member that hides the edge of the given through-hole 110; wherein, these lighting installs may be referred to as using a flangeless trim member or also often known as a "spackle frame" member. See e.g., references to "spackle-frame 201" from issued U.S. utility U.S. Pat. No. 11,662,084, wherein the disclosure and teachings of which are incorporated by reference herein. However, when a given prior art spackle frame, such as spackle frame 120 of FIG. 1D, is installed within a given through-hole 110, within a given section of drywall 100, the flange 121 portion of that prior art spackle frame 120 rests on top of the exterior surface of drywall 100, as shown in FIG. 1D. Thus, in the prior art install as shown in FIG. 1D, the flange 121 portion of the prior art spackle frame 120 is not flush with the exterior surface of drywall 100, and so after joint compound (mud) is used on the flange 121 portion, a change in elevation (height) as between flange 121 and the exterior surface of drywall 100, may be discernibly visible to a viewer located below that section of drywall 100. For some this visibly discernible change in elevation (height) may be undesirable, as while there is no visible flange trim member, that change in elevation (height) acts as a visible flange trim member (but one that is made painted joint compound). The hole-saw-with-annular-rabbet-maker 200 (tool 200) disclosed and taught in this patent application corrects this problem.

Figure 1E:
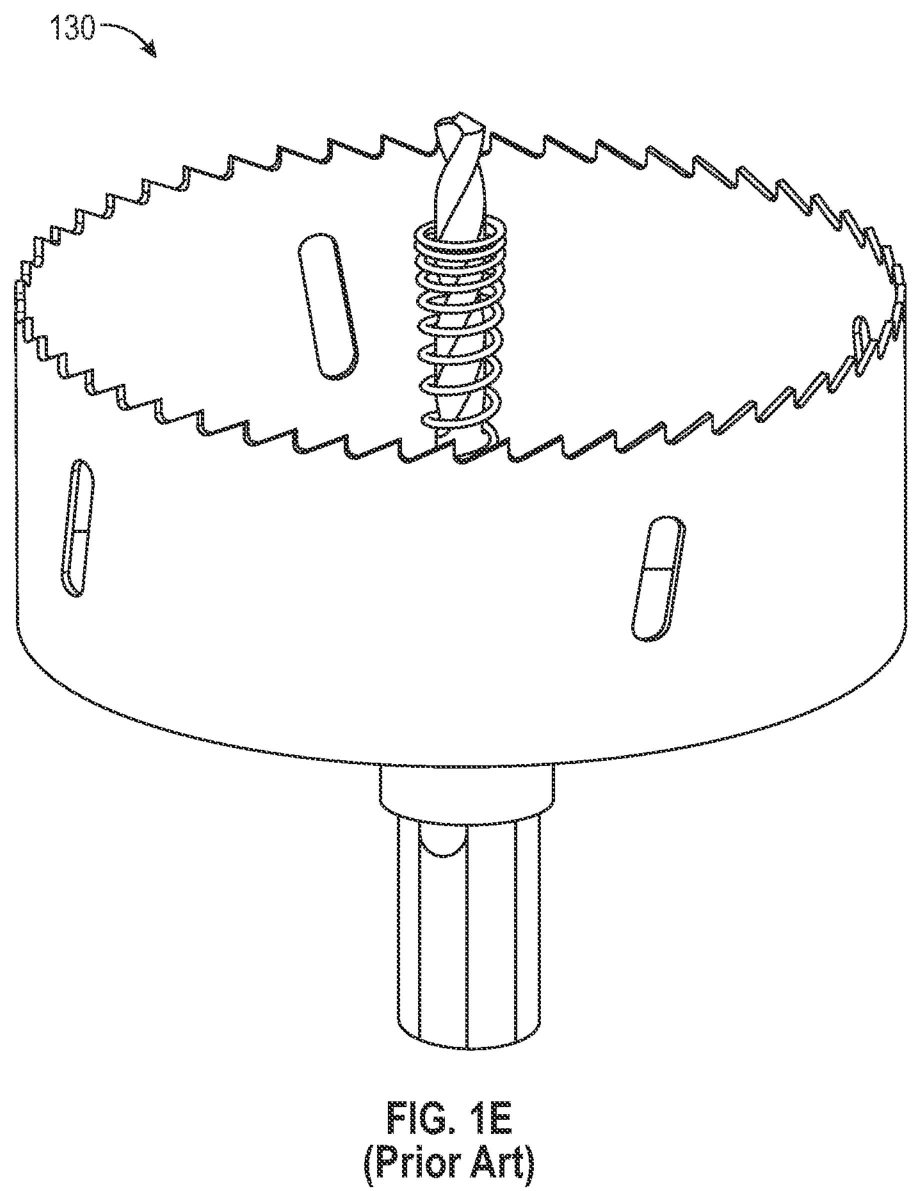
FIG. 1E shows a perspective view of a generic and/or typical hole saw that is used to create through-holes in drywall.

FIG. 1E shows a perspective view of a generic and/or typical hole saw 130. FIG. 1E is prior art. The arbor (shaft or shank) of hole saw 130 is typically removably connected a drill's (or an impact driver's) chuck for use. Hole saw 130 may be used to generate through-hole(s) 110. A spade bit or an auger bit may also be used to create holes in substrate, such as, drywall 100.

Figure 2A:
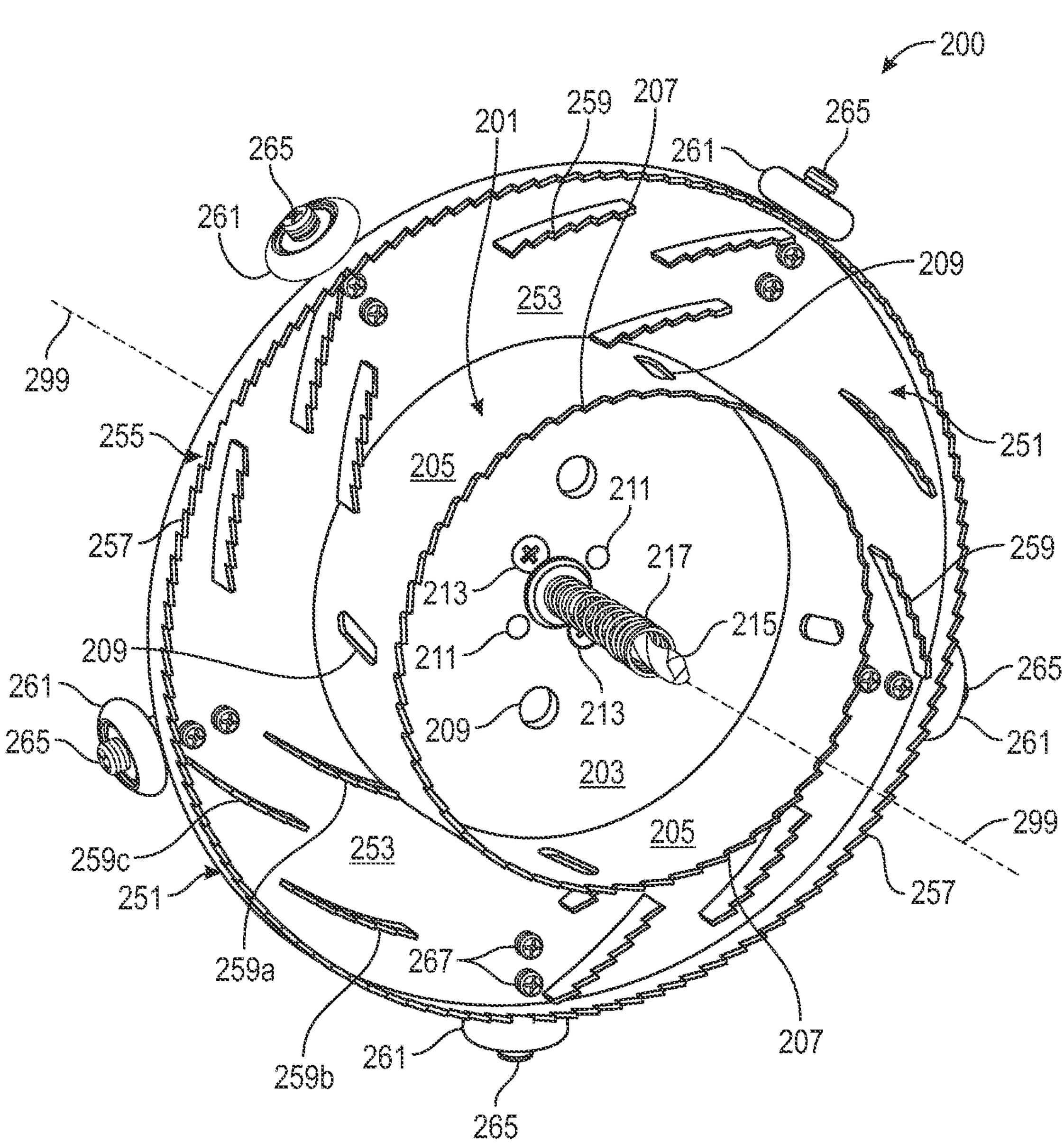
FIG. 2A depicts a top perspective view of a hole-saw-with-annular-rabbet-maker according to at least one embodiment of the present invention (in its assembled and ready to be used configuration).
Figure 5A:
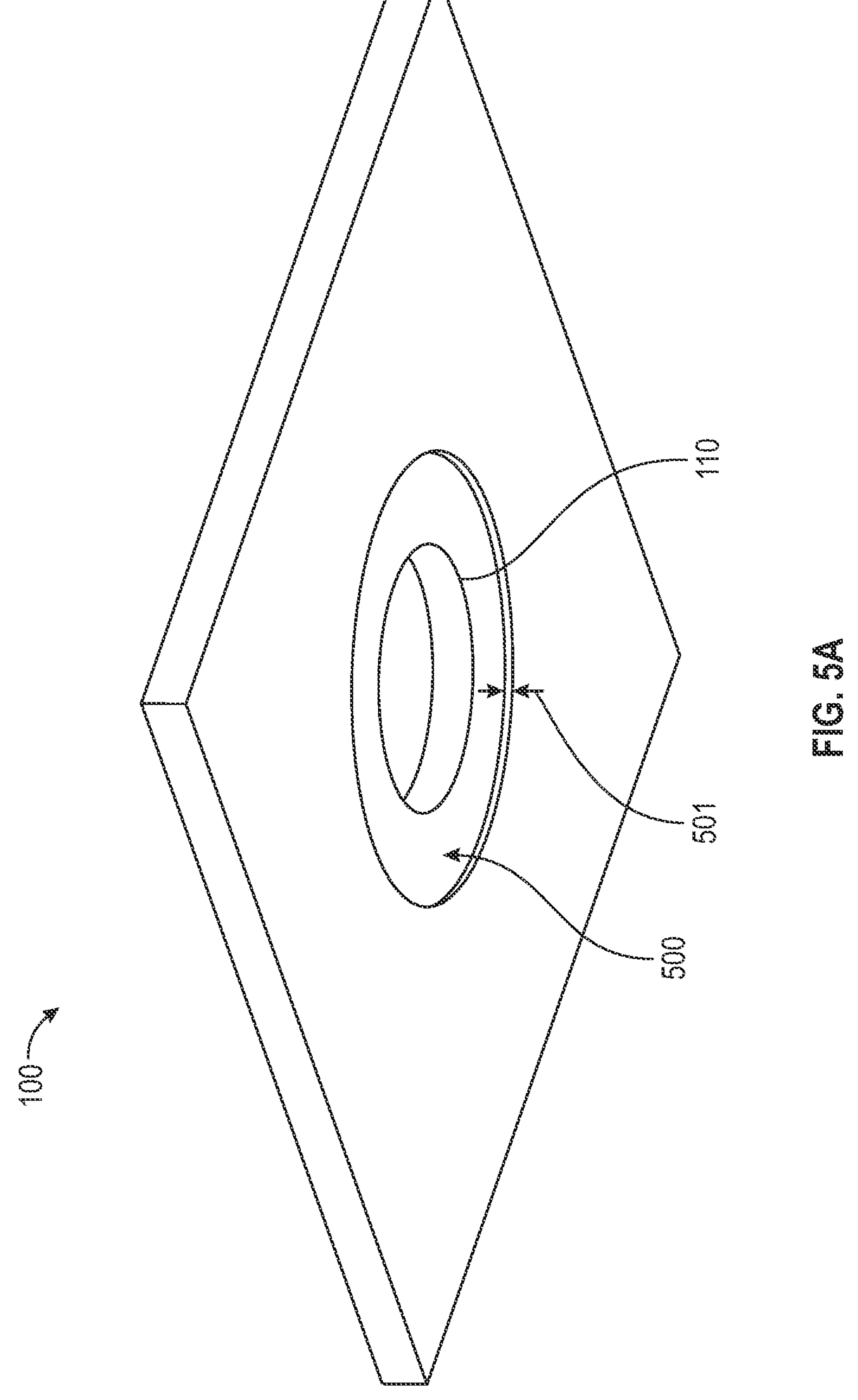
FIG. 5A depicts a bottom perspective view of a section (portion) of drywall where the hole-saw-with-annular-rabbet-maker from FIG. 2A has completed operating thereon (as intended) to generate a through-hole within that given section (portion) of drywall and also generating immediately surround a perimeter (circumference) of that through-hole, an annular-rabbet within that same section (portion) of drywall.

FIG. 2A depicts a top perspective view of a hole-saw-with-annular-rabbet-maker 200 (tool 200) according to at least one embodiment of the present invention (in its assembled and ready to be used configuration). In some embodiments, use of a given hole-saw-with-annular-rabbet-maker 200 (with a hand drill and/or a hand impact driver) may result in an annular rabbet 500 (annular-rabbet 500) and a through-hole 110 in a given section of drywall 100, e.g., as shown in FIG. 5A and/or in FIG. 5B. In some embodiments, a given hole-saw-with-annular-rabbet-maker 200 may comprise a hole-saw 201, an integral rabbet-making-means (rabbet-excavating-means) 251, a collar 271, and an arbor (shaft or shank) 275. Note, collar 271 and arbor (shaft or shank) 275 are not visible in FIG. 2A, but are shown and visible in FIG. 2B.

Continuing discussing FIG. 2A, in some embodiments, hole-saw 201 may be structurally and/or functionally similar to prior art hole saw 130 (shown in FIG. 1E), except that hole-saw 201 may be (directly) attached and/or mounted to at least some structure of the integral rabbet-making-means (rabbet-excavating-means) 251; and/or that hole-saw 201 may be in direct physical communication with at least some structure of the integral rabbet-making-means (rabbet-excavating-means) 251. In some embodiments, hole-saw 201 may comprise: a first-circular-base (smaller-circular-base) 203, a cylindrical-sidewall 205, a hole-cutting-means 207, at least one slot(s)/aperture(s) 209, at least one fastener-aperture 211, at least one fastener 213, a positioning-drill-bit (centering-drill-bit) 215, a discharge-spring 217, a portion thereof, combinations thereof, and/or the like.

Continuing discussing FIG. 2A, in some embodiments, first-circular-base (smaller-circular-base) 203 may be a round, circular, disc (disk) like base member of a given hole-saw 201. In some embodiments, first-circular-base (smaller-circular-base) 203 may be rigid and/or structural. In some embodiments, in direct physical communication with a top exterior outer surface of first-circular-base (smaller-circular-base) 203 and extending upwards away from first-circular-base (smaller-circular-base) 203 may be the cylindrical-sidewall 205. In some embodiments, cylindrical-sidewall 205 may be a substantially solid (aside from slot(s)/aperture(s) 209) sidewall member that is substantially hollow (aside from positioning-drill-bit (centering-drill-bit) 215 and discharge-spring 217) and that is at least substantially (mostly) cylindrical in shape and open at its top that is disposed away from first-circular-base (smaller-circular-base) 203.

Continuing discussing FIG. 2A, in some embodiments, located on the top of cylindrical-sidewall 205 (disposed away from first-circular-base (smaller-circular-base) 203) may be the hole-cutting-means 207. In some embodiments, hole-cutting-means 207 may run around a top of cylindrical-sidewall 205. In some embodiments, hole-cutting-means 207 may run continuously, without interruption around a top of cylindrical-sidewall 205. In some embodiments, hole-cutting-means 207 may be a saw, a blade, a plurality of saw teeth, a cutting implement, a cutting edge, a sawing implement, a portion thereof, a combination thereof, and/or the like. In some embodiments, at least a portion of hole-cutting-means 207 may comprise carbide and/or diamond cutting means. In some embodiments, hole-cutting-means 207 may be configured to cut into a predetermined material, such as, but not limited to, drywall 100, wood, metal, ceramic, plywood, particle board, OSB, a wood stud, a metal stud, engineered lumber, a laminate, masonry, cement board, stone, brick, concrete, fiber board, insulation, a portion thereof, a combination thereof, and/or the like.

Continuing discussing FIG. 2A, in some embodiments, located on cylindrical-sidewall 205 may be at least one slot(s) and/or aperture(s) 209. In some embodiments, disposed on cylindrical-sidewall 205 may be a plurality of slots and/or apertures 209. In some embodiments, slot(s)/aperture(s) 209 may be through slot(s) and/or through aperture(s) in cylindrical-sidewall 205. In some embodiments, a given slot(s)/aperture(s) 209 may pass entirely through a thickness of cylindrical-sidewall 205. In some embodiments, slot(s)/aperture(s) 209 may be located on first-circular-base (smaller-circular-base) 203 and may pass entirely through a thickness of first-circular-base (smaller-circular-base) 203. In some embodiments, slot(s)/aperture(s) 209 may be configured to aid, promote, facilitate, and/or the like of the removal of sawdust, chips, and/or of plug material as a result of hole-saw 201 (hole-cutting-means 207) rotationally cutting into some material, such as, but not limited to drywall 100 (and/or wood, metal, ceramic, plywood, particle board, OSB, a wood stud, a metal stud, engineered lumber, a laminate, masonry, cement board, stone, brick, concrete, fiber board, insulation, a portion thereof, a combination thereof, and/or the like). In some embodiments, slot(s) 209 may run in a direction that is slanted, i.e., that is not parallel with common-rotational-axis 299.

Continuing discussing FIG. 2A, in some embodiments, common-rotational-axis 299, of hole-saw-with-annular-rabbet-maker 200, may be a center rotational axis that many structures of hole-saw-with-annular-rabbet-maker 200 spin (symmetrically) around when hole-saw-with-annular-rabbet-maker 200 is in intended hole making and/or rabbet making use. In some embodiments, common-rotational-axis 299 may be a center rotational axis, of hole-saw-with-annular-rabbet-maker 200, that first-circular-base (smaller-circular-base) 203, cylindrical-sidewall 205, hole-cutting-means 207, positioning-drill-bit (centering-drill-bit) 215, rabbet-making-means (rabbet-excavating-means) 251, second-circular-base (largest-circular-base) 253, outermost-cylindrical-sidewall 255, outermost-cutting-means 257, interior-rabbet-making-means 259, collar 271, and/or arbor (shaft or shank) 275 spin (symmetrically) around when hole-saw-with-annular-rabbet-maker 200 is in intended hole making and/or rabbet making use (i.e., actively rotating/spinning about common-rotational-axis 299).

Continuing discussing FIG. 2A, in some embodiments, a given fastener-aperture 211 may be hole through first-circular-base (smaller-circular-base) 203 that is configured to receive at least some portion of a given fastener 213. In some embodiments, at least one (1) fastener-aperture 211 may be located on first-circular-base (smaller-circular-base) 203. In some embodiments, two or more fastener-apertures 211 may be located on first-circular-base (smaller-circular-base) 203. In some embodiments, fastener-aperture(s) 211 may be located closer to positioning-drill-bit (centering-drill-bit) 215 or to discharge-spring 217than to cylindrical-sidewall 205. In some embodiments, hole-saw-with-annular-rabbet-maker 200 and/or hole-saw 201 may comprise at least one: fastener-aperture 211 and fastener 213. In some embodiments, more fastener-aperture(s) 211 may be used (present) than fastener(s) 213. In some embodiments, fastener 213 may be a mechanical fastener, such as, but not limited to, a screw, a bolt, a rivet, a pin, a dowel, a nail, a portion thereof, combinations thereof, and/or the like. In some embodiments, fastener 213 may be configured to attaching first-circular-base (smaller-circular-base) 203 and second-circular-base (largest-circular-base) 253 to collar 271. In some embodiments, when fastener 213 is in intended use, (different) portions of fastener 213 may pass through first-circular-base (smaller-circular-base) 203, second-circular-base (largest-circular-base) 253, and into collar 271.

Continuing discussing FIG. 2A, in some embodiments, extending through a radial center of first-circular-base (smaller-circular-base) 203 and in a manner that is parallel, colinear, coaxial, and/or coincident with common-rotational-axis 299, and away from first-circular-base (smaller-circular-base) 203 may be a single positioning-drill-bit (centering-drill-bit) 215. In some embodiments, a length of positioning-drill-bit (centering-drill-bit) 215 may be longer than a height (tallness) of cylindrical-sidewall 205 (see e.g., FIG. 2C through FIG. 2F). In some embodiments a terminal tip of positioning-drill-bit (centering-drill-bit) 215 (disposed away from first-circular-base (smaller-circular-base) 203) may extend beyond (past) the height of cylindrical-sidewall 205 (see e.g., FIG. 2C through FIG. 2F). In some embodiments, when a given user is using hole-saw-with-annular-rabbet-maker 200, positioning-drill-bit (centering-drill-bit) 215 may be first portion of hole-saw-with-annular-rabbet-maker 200 that physically contacts the substrate/working surface (e.g., an exterior surface of a given section of drywall 100). In some embodiments, a user placing a terminal tip of positioning-drill-bit (centering-drill-bit) 215 (e.g., that is disposed away from first-circular-base (smaller-circular-base) 203) against the substrate/working surface (e.g., an exterior surface of a given section of drywall 100), that user may then center and/or position hole-saw-with-annular-rabbet-maker 200 into a desired location to generate the through-hole 110 and the rabbet 500.

Continuing discussing FIG. 2A, in some embodiments, a discharge-spring 217 may be located around the positioning-drill-bit (centering-drill-bit) 215. In some embodiments, discharge-spring 217 may be helical and/or coil spring, that has an overall shape similar to that of a hollow cylinder. In some embodiments, the overall length of the hollow cylinder shape of discharge-spring 217 may be at least substantially (mostly) parallel with a length of positioning-drill-bit (centering-drill-bit) 215. In some embodiments, discharge-spring 217 and positioning-drill-bit (centering-drill-bit) 215 may have at least a substantially (mostly) coaxial relationship with each other. In some embodiments, during normal use of hole-saw-with-annular-rabbet-maker 200, as a portion of the substrate/working surface (e.g., an exterior surface of a given section of drywall 100) fills in a volume within cylindrical-sidewall 205, discharge-spring 217 may be compressed; and when that hole making is finished and hole-saw-with-annular-rabbet-maker 200 is removed from the substrate/working surface (e.g., an exterior surface of a given section of drywall 100), then discharge-spring 217 may aid in the removal of the plug of that substrate/working surface material that may reside within cylindrical-sidewall 205.

In some embodiments, discharge-spring 217 may be optional and/or omitted in hole-saw 201 and/or in hole-saw-with-annular-rabbet-maker 200. In some embodiments, a given hole-saw 201 may be without a discharge-spring 217.

Continuing discussing FIG. 2A, in some embodiments, when hole-saw-with-annular-rabbet-maker 200 may be intended rotational (spinning) use, rabbet-making-means (rabbet-excavating-means) 251 may be configured for making a given rabbet 500 in a working surface, such as, but not limited to a section of drywall 100. In some embodiments, rabbet-making-means (rabbet-excavating-means) 251 may comprise: a second-circular-base (largest-circular-base) 253, an outermost-cylindrical-sidewall 255, an outermost-cutting-means 257, an interior-rabbet-making-means 259, at least three (3) guide-wheels 261, at least three (3) housings-for-pins 263, at least three (3) fasteners-with-pin-for-wheels/bearings 265, at least three (3) fasteners-for-housings 267, a portion thereof, combinations thereof, and/or the like. Note, housings-for-pins 263 are not be visible in FIG. 2A; however, housings-for-pins 263 are visible and shown in FIG. 2B.

Figure 4A:
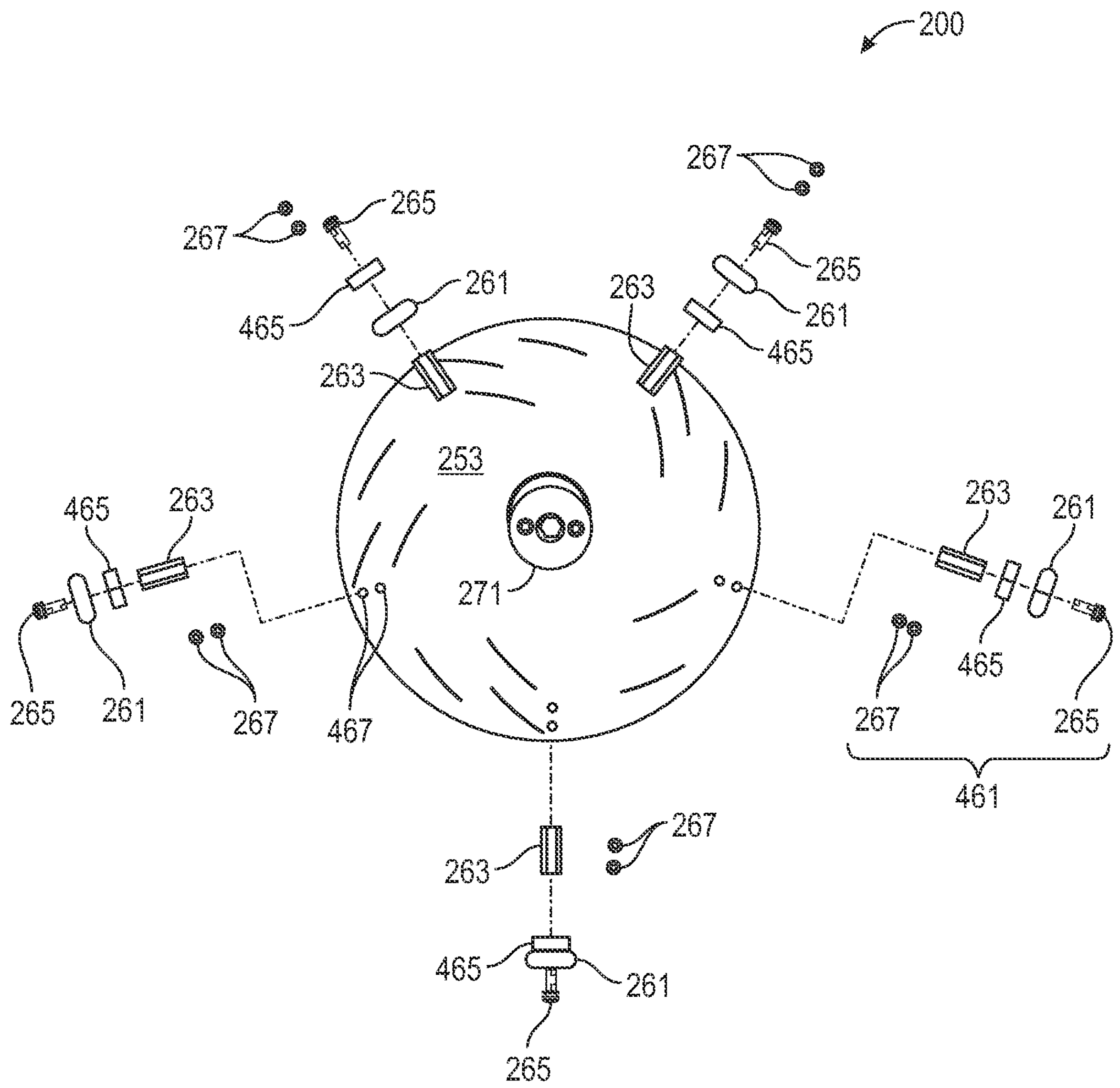
FIG. 4A depicts a bottom exploded view of hole-saw-with-annular-rabbet-maker from FIG. 2A.
Figure 4B:
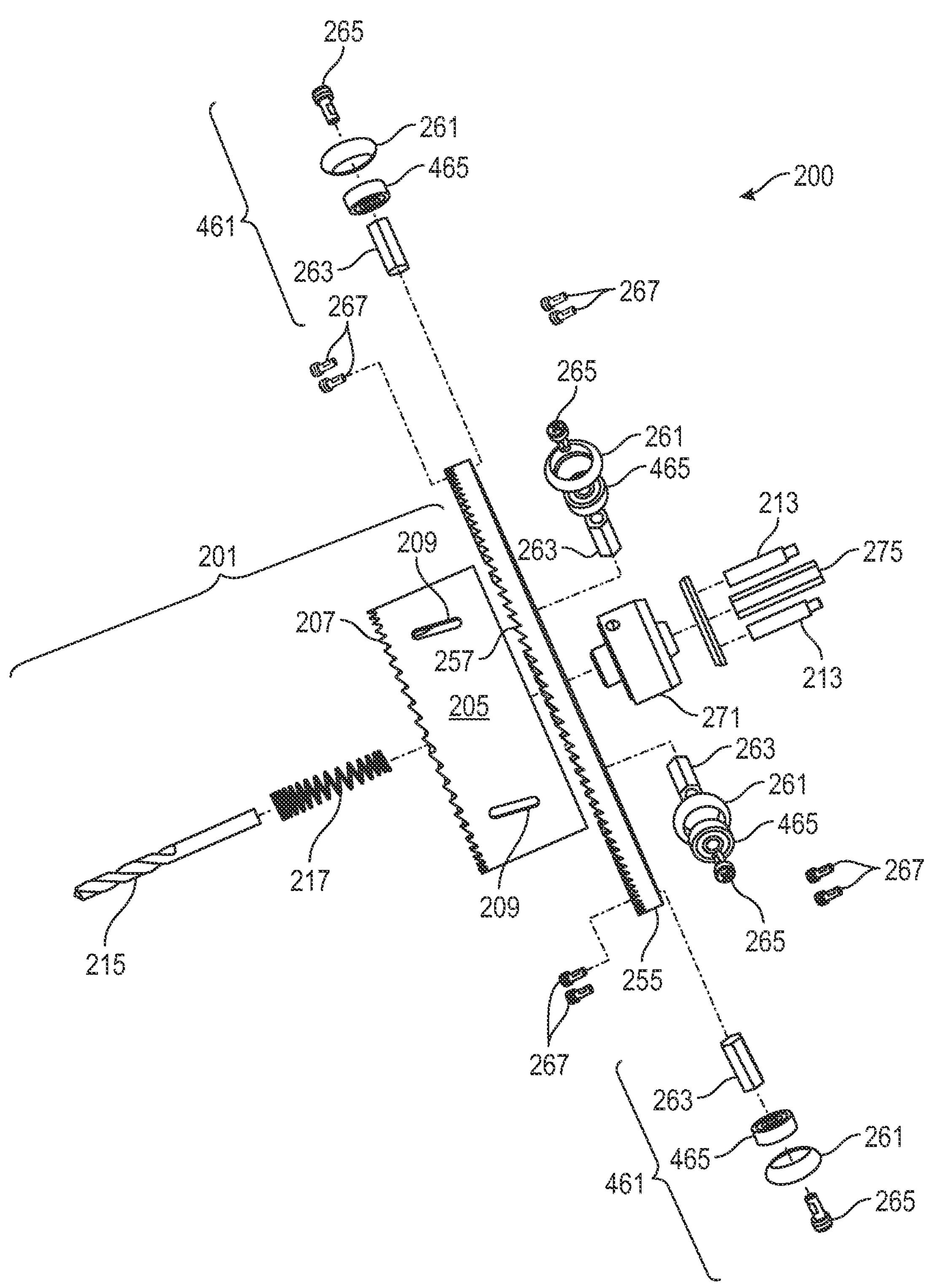
FIG. 4B depicts an exploded view from a side of hole-saw-with-annular-rabbet-maker from FIG. 2A.

Note, a guide-wheel 261, a housing-for-pin 263, a fastener-with-pin-for-wheels/bearing 265, a fastener-for-housing 267, and a bearing 465 are all part of a guide-wheel-assembly 461, wherein reference numeral "461" is called out in FIG. 4A and in FIG. 4B.

In some embodiments, guide-wheel-assemblies 461, guide-wheels 261, housings-for-pins 263, fasteners-with-pin-for-wheels/bearings 265, and/or fasteners-for-housings 267 may be optional and/or omitted in rabbet-making-means (rabbet-excavating-means) 251 and/or in hole-saw-with-annular-rabbet-maker 200. In some embodiments, a given rabbet-making-means (rabbet-excavating-means) 251 and/or hole-saw-with-annular-rabbet-maker 200may be without guide-wheel-assemblies 461, guide-wheels 261, housings-for-pins 263, fasteners-with-pin-for-wheels/bearings 265, and/or fasteners-for-housings 267.

In some embodiments, guide-wheel-assemblies 461 (and its parts) may considered an assembly of hole-saw-with-annular-rabbet-maker 200 and not of rabbet-making-means (rabbet-excavating-means) 251.

Continuing discussing FIG. 2A, in some embodiments, second-circular-base (largest-circular-base) 253 may be a round, circular, disc (disk) like base member of a given rabbet-making-means (rabbet-excavating-means) 251. In some embodiments, second-circular-base (largest-circular-base) 253 may be rigid and/or structural. In some embodiments, a diameter of second-circular-base (largest-circular-base) 253 is larger than a diameter of first-circular-base (smaller-circular-base) 203. In some embodiments common-rotational-axis 299 simultaneously passes through the radial centers of both second-circular-base (largest-circular-base) 253 and of first-circular-base (smaller-circular-base) 203 (when hole-saw-with-annular-rabbet-maker 200 is an assembled ready for use configuration, such as is shown in FIG. 2A). In some embodiments, the radial centers of second-circular-base (largest-circular-base) 253 and of first-circular-base (smaller-circular-base) 203 are colinear and/or coincident with each other (when hole-saw-with-annular-rabbet-maker 200 is an assembled ready for use configuration, such as is shown in FIG. 2A). In some embodiments, at least most of a bottom surface of first-circular-base (smaller-circular-base) 203 is located directly on top of at least a portion of a top surface of second-circular-base (largest-circular-base) 253 (when hole-saw-with-annular-rabbet-maker 200 is an assembled ready for use configuration, such as is shown in FIG. 2A). In some embodiments, at least most of a bottom surface of first-circular-base (smaller-circular-base) 203 is in direct physical contact (communication) with at least a portion of a top surface of second-circular-base (largest-circular-base) 253 (when hole-saw-with-annular-rabbet-maker 200 is an assembled ready for use configuration, such as is shown in FIG. 2A).

Continuing discussing FIG. 2A, in some embodiments, in direct physical communication with a top exterior outer surface of second-circular-base (largest-circular-base) 253 and extending upwards away from second-circular-base (largest-circular-base) 253 may be the outermost-cylindrical-sidewall 255. In some embodiments, outermost-cylindrical-sidewall 255 may be a at least substantially (mostly) solid sidewall member that is substantially hollow (aside from hole-saw 201 elements, interior-rabbet-making-means 259 elements, and possibly [optionally] fasteners-for-housings 267) and that is at least substantially (mostly) cylindrical in shape and open at its top that is disposed away from second-circular-base (largest-circular-base) 253.

Continuing discussing FIG. 2A, in some embodiments, a height (tallness) of outermost-cylindrical-sidewall 255 is shorter than a height (tallness) of cylindrical-sidewall 205. In some embodiments, the height (tallness) of outermost-cylindrical-sidewall 255 may be the same or greater than a depth-of-rabbet 501 (see FIG. 5A and/or FIG. 5B for depth-of-rabbet 501). In some embodiments, when hole-saw-with-annular-rabbet-maker 200 is an assembled ready for use configuration, such as is shown in FIG. 2A, outermost-cylindrical-sidewall 255 and cylindrical-sidewall 205 may have at least a substantially (mostly) concentric relationship (orientation) with each other. In some embodiments, when hole-saw-with-annular-rabbet-maker 200 is an assembled ready for use configuration, such as is shown in FIG. 2A, a distance between outermost-cylindrical-sidewall 255 and cylindrical-sidewall 205 may be constant and fixed. In some embodiments, when hole-saw-with-annular-rabbet-maker 200 is an assembled ready for use configuration, such as is shown in FIG. 2A, cylindrical-sidewall 205 may be located closer to positioning-drill-bit (centering-drill-bit) 215 and/or to discharge-spring 217 as compared to outermost-cylindrical-sidewall 255. In some embodiments, when hole-saw-with-annular-rabbet-maker 200 is an assembled ready for use configuration, such as is shown in FIG. 2A, outermost-cylindrical-sidewall 255 may be located further away from positioning-drill-bit (centering-drill-bit) 215 and/or from discharge-spring 217 as compared to cylindrical-sidewall 205.

Continuing discussing FIG. 2A, in some embodiments, located on the top of outermost-cylindrical-sidewall 255 (disposed away from second-circular-base (largest-circular-base) 253) may be the outermost-cutting-means 257. In some embodiments, outermost-cutting-means 257 may run around a top of outermost-cylindrical-sidewall 255. In some embodiments, outermost-cutting-means 257 may run continuously, without interruption around a top of outermost-cylindrical-sidewall 255. In some embodiments, outermost-cutting-means 257 may be a saw, a blade, a plurality of saw teeth, a cutting implement, a cutting edge, a sawing implement, a portion thereof, a combination thereof, and/or the like. In some embodiments, at least a portion of outermost-cutting-means 257 may comprise carbide and/or diamond cutting means. In some embodiments, outermost-cutting-means 257 may be configured to cut into a predetermined material, such as, but not limited to, drywall 100, wood, metal, ceramic, plywood, particle board, OSB, a wood stud, a metal stud, engineered lumber, a laminate, masonry, cement board, stone, brick, concrete, fiber board, insulation, a portion thereof, a combination thereof, and/or the like. In some embodiments, outermost-cutting-means 257 may form, create, generate, and/or define the outer diameter edge of rabbet 500 in drywall 100.

Continuing discussing FIG. 2A, in some embodiments, interior-rabbet-making-means 259 may be configured for forming, creating, and/or generating at least a majority of rabbet 500 in drywall 100. In some embodiments, when hole-saw-with-annular-rabbet-maker 200 is rotating (spinning) against drywall 100, aspects of interior-rabbet-making-means 259 may cut, saw, grind, abrade, chip, and/or the like drywall 100 material out of a region that results in rabbet 500. In some embodiments, located between cylindrical-sidewall 205 and outermost-cylindrical-sidewall 255 and on top of second-circular-base (largest-circular-base) 253 may be interior-rabbet-making-means 259. In some embodiments, interior-rabbet-making-means 259 may comprise a plurality of distinct raised fin (ridge) members, of fixed, non-variable, finite, and/or predetermined length, that extend upwards and orthogonally from second-circular-base (largest-circular-base) 253, of fixed, non-variable, finite, and/or predetermined height (aside from undulations in terminating saw teeth), that distally terminate in a saw, a blade, a plurality of saw teeth, a cutting implement, a cutting edge, a sawing implement, a portion thereof, a combination thereof, and/or the like. In some embodiments, the tops of interior-rabbet-making-means 259 (that are disposed away from second-circular-base (largest-circular-base) 253) may be configured to cut, saw, grind, abrade, chip, and/or the like material out of and/or from a given section of drywall 100, wood, metal, ceramic, plywood, particle board, OSB, a wood stud, a metal stud, engineered lumber, a laminate, masonry, cement board, stone, brick, concrete, fiber board, insulation, a portion thereof, a combination thereof, and/or the like. In some embodiments, when hole-saw-with-annular-rabbet-maker 200 is rotating (spinning) about common-rotational-axis 299, the interior-rabbet-making-means 259 may provide cutting, sawing, grinding, abrading, chipping, and/or the like coverage over the entire surface area of second-circular-base (largest-circular-base) 253. In some embodiments, a height (tallness) of interior-rabbet-making-means 259 may be at least substantially (mostly) identical to a height (tallness) of outermost-cylindrical-sidewall 255.

Continuing discussing FIG. 2A, in some embodiments, a plurality of interior-rabbet-making-means 259 may be grouped into different sets of interior-rabbet-making-means 259 by location, such as, innermost-interior-rabbet-making-means 259*a*, middle-interior-rabbet-making-means 259*b*, and outermost-interior-rabbet-making-means 259*c*. In some embodiments, innermost-interior-rabbet-making-means 259*a* may be interior-rabbet-making-means 259 that are located closest to cylindrical-sidewall 205 and furthest way from outermost-cylindrical-sidewall 255. In some embodiments, outermost-interior-rabbet-making-means 259*c* may be interior-rabbet-making-means 259 that are located closest to outermost-cylindrical-sidewall 255 and furthest away from cylindrical-sidewall 205. In some embodiments, middle-interior-rabbet-making-means 259*b* may be interior-rabbet-making-means 259 are at least partially disposed between innermost-interior-rabbet-making-means 259*a* and outermost-interior-rabbet-making-means 259*c*.

Figure 2B:
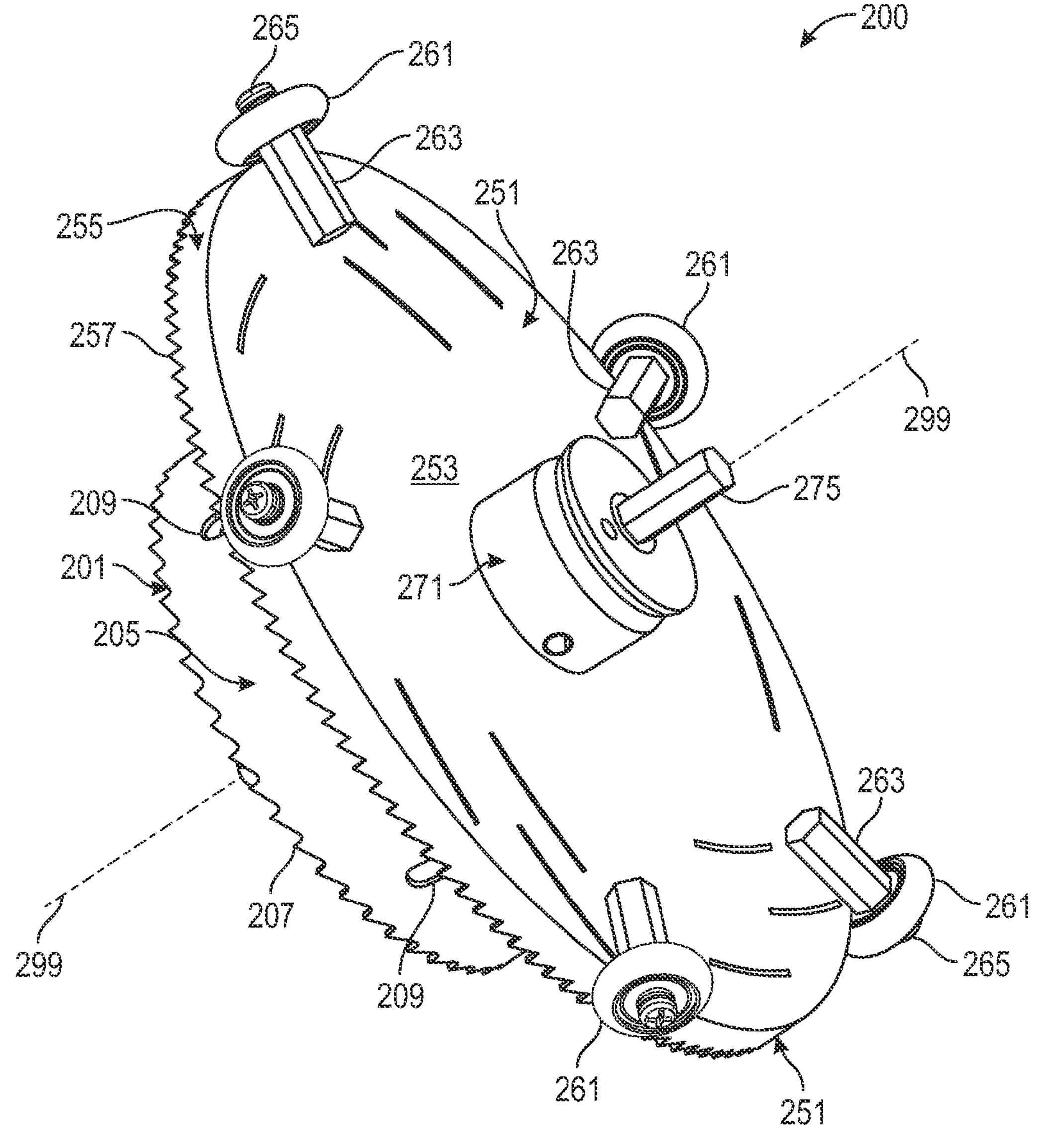
FIG. 2B depicts a bottom perspective view of the hole-saw-with-annular-rabbet-maker from FIG. 2A (in its assembled and ready to be used configuration).
Figure 2C:
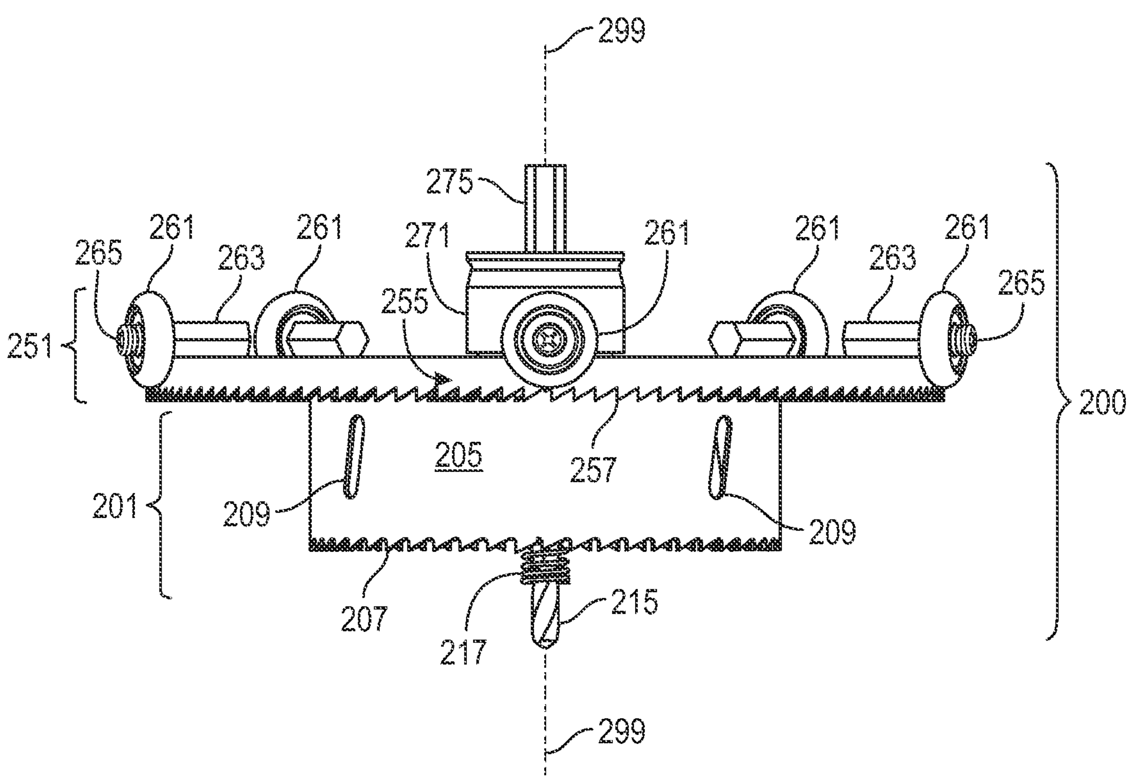
FIG. 2C depicts a front view of hole-saw-with-annular-rabbet-maker from FIG. 2A (in its assembled and ready to be used configuration).
Figure 2D:
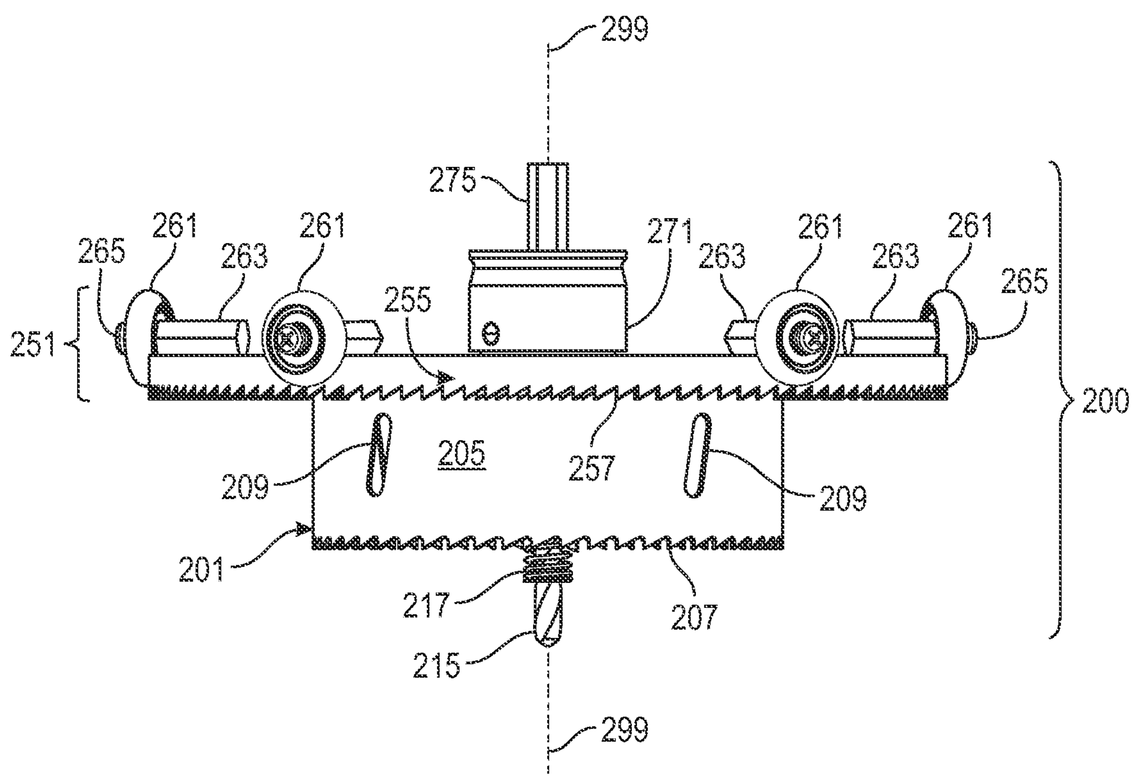
FIG. 2D depicts a rear (back) view of hole-saw-with-annular-rabbet-maker from FIG. 2A (in its assembled and ready to be used configuration).
Figure 2E:
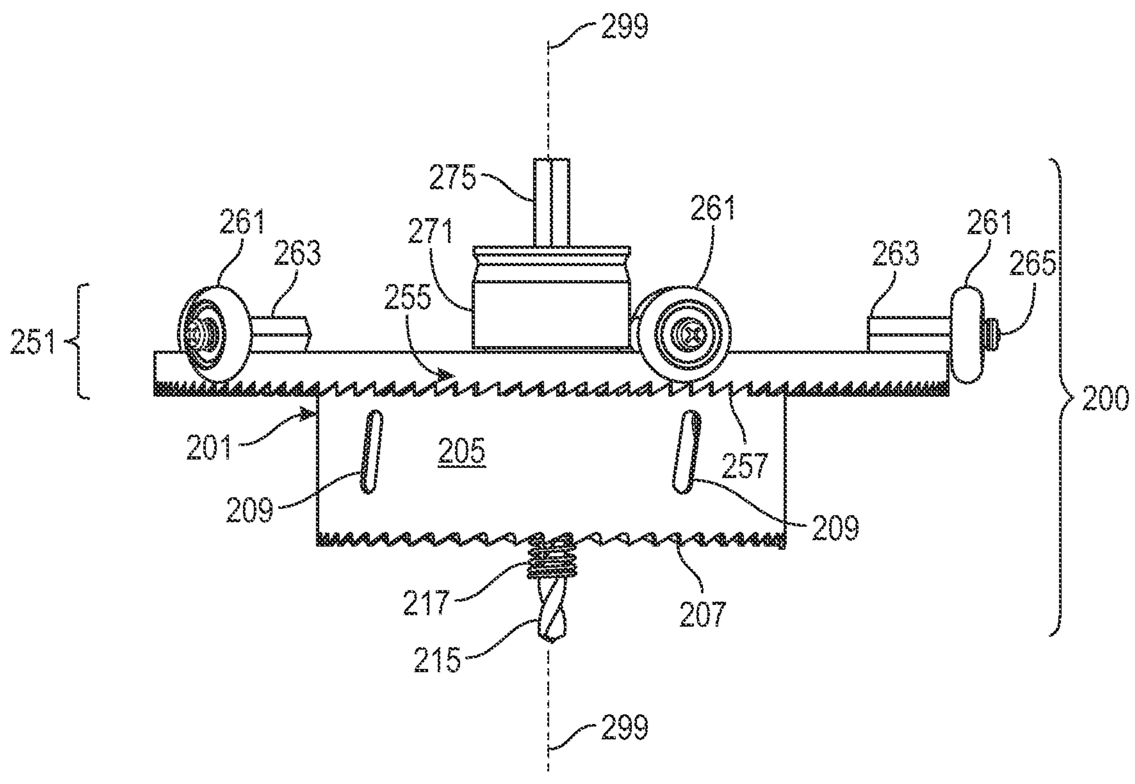
FIG. 2E depicts a left-side view of hole-saw-with-annular-rabbet-maker from FIG. 2A (in its assembled and ready to be used configuration).
Figure 2F:
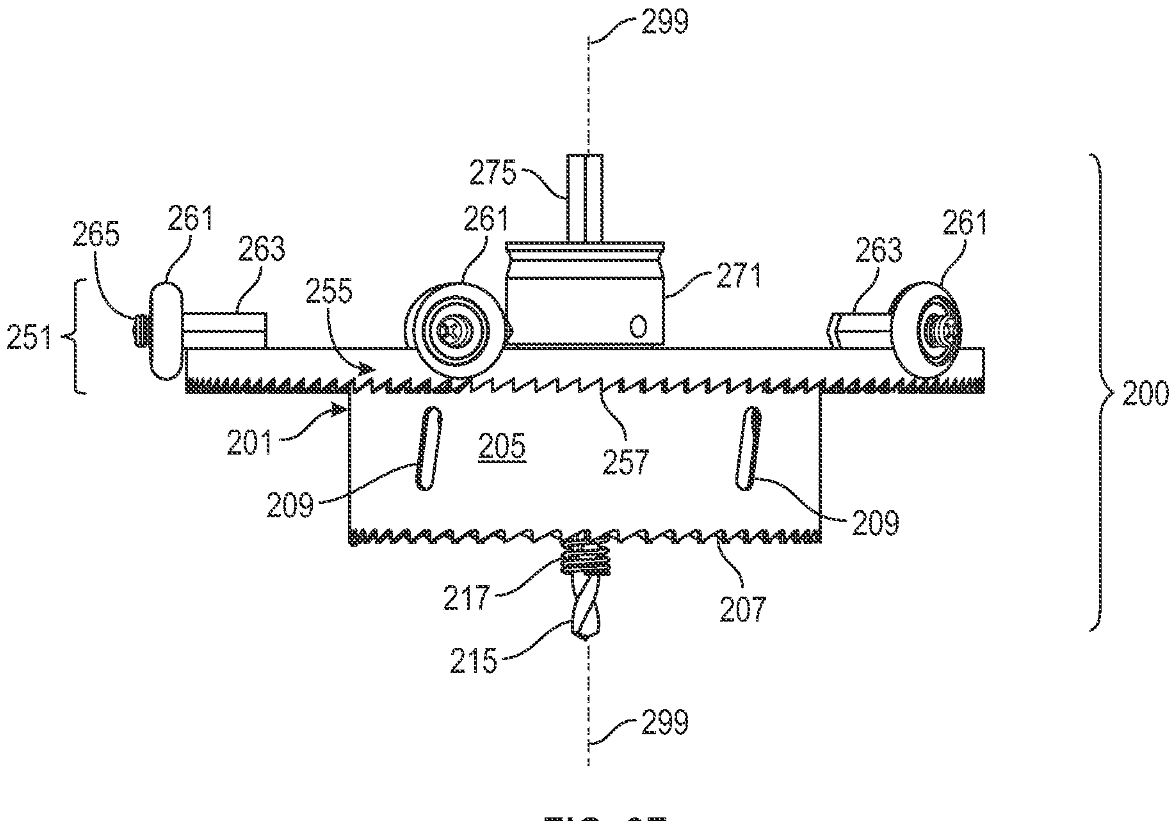
FIG. 2F depicts a right-side view of hole-saw-with-annular-rabbet-maker from FIG. 2A (in its assembled and ready to be used configuration).
Figure 2G:
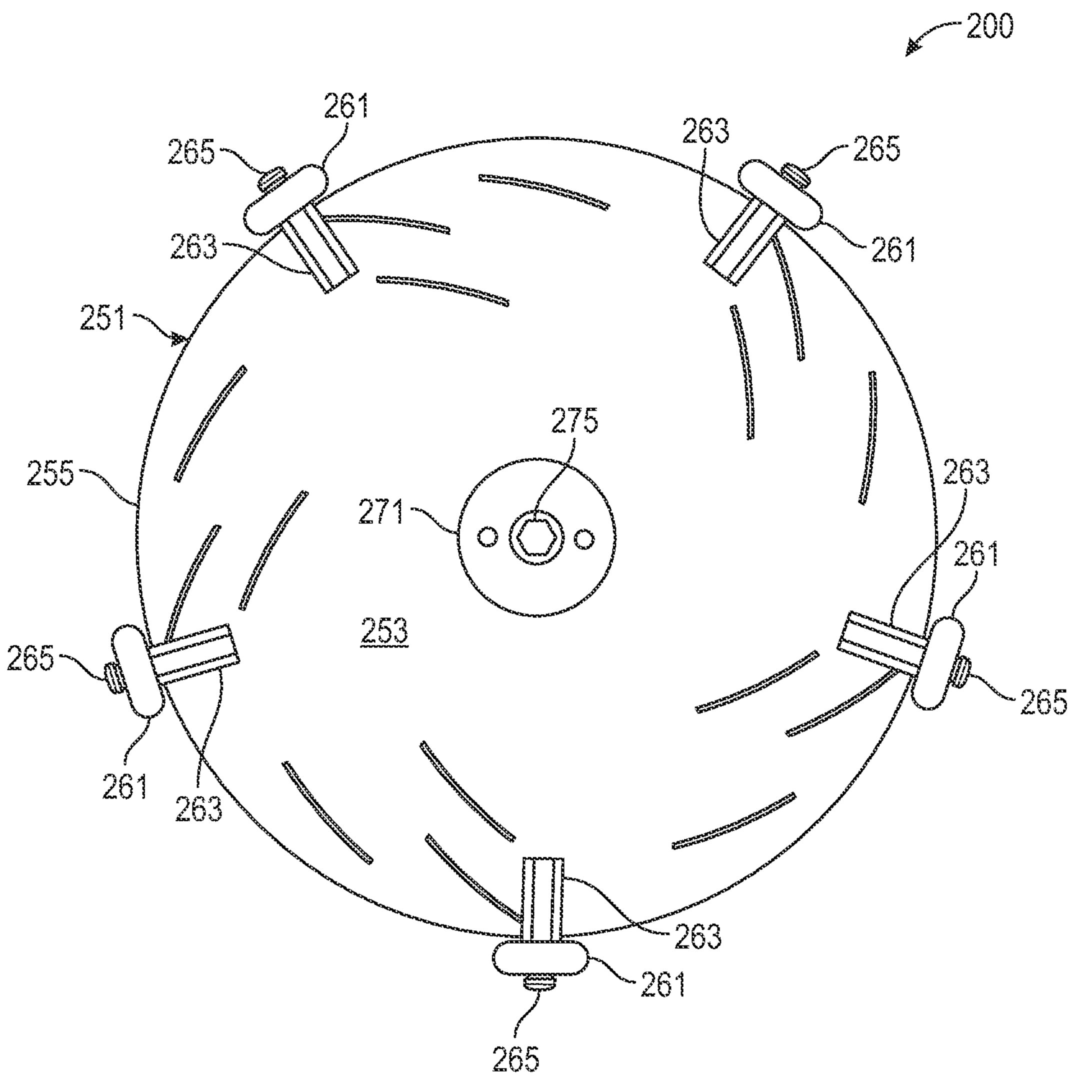
FIG. 2G depicts a bottom view of hole-saw-with-annular-rabbet-maker from FIG. 2A (in its assembled and ready to be used configuration).
Figure 2H:
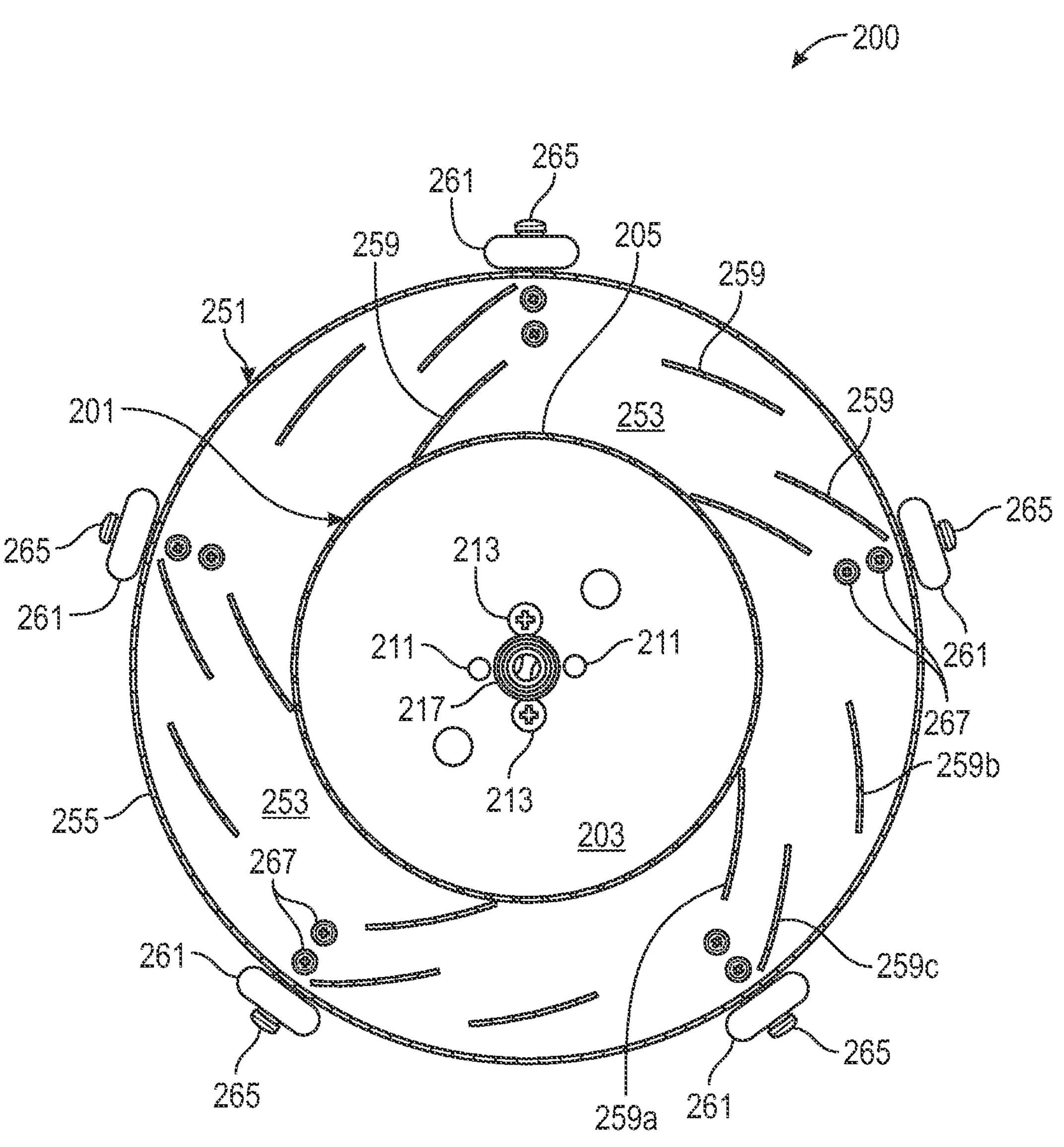
FIG. 2H depicts a top view of hole-saw-with-annular-rabbet-maker from FIG. 2A (in its assembled and ready to be used configuration).

See also FIG. 2H for locations, layouts, and configurations for innermost-interior-rabbet-making-means 259*a*, middle-interior-rabbet-making-means 259*b*, and outermost-interior-rabbet-making-means 259*c*.

Note use of reference numerals "259" without use of the "a," "b," or "c" subscripts could be in reference to any of interior-rabbet-making-means 259, innermost-interior-rabbet-making-means 259*a*, middle-interior-rabbet-making-means 259*b*, outermost-interior-rabbet-making-means 259*c*, and/or combinations thereof.

FIG. 2B depicts a bottom perspective view of hole-saw-with-annular-rabbet-maker 200 (in its assembled and ready to be used configuration). In some embodiments, rabbet-making-means (rabbet-excavating-means) 251 may comprise at least three (3) guide-wheel-assemblies 461. Note, reference numeral "461" is called out in FIG. 4A and in FIG. 4B. In some embodiments, a given guide-wheel-assembly 461 may comprise a fastener-with-pin-for-wheel/bearing 265, a guide-wheel 261, a bearing 465 (shown in FIG. 4B), a housing-for-pin 263, and at least one fastener-for-housing 267 (shown in FIG. 2A). In some embodiments, a given guide-wheel-assembly 461 may affix a rotatable guide-wheel 261 to a bottom portion of second-circular-base (largest-circular-base) 253 and to an outer (outside) edge of second-circular-base (largest-circular-base) 253 as shown in FIG. 2B. In some embodiments, at least three (3) or more guide-wheels 261 equidistant disposed around an outside (outer) periphery of second-circular-base (largest-circular-base) 253 may promote, allow, and/or facilitate second-circular-base (largest-circular-base) 253 to rotationally spin around an exterior surface of drywall 100. In some embodiments, fixed, finite, non-variable, and/or predetermined dimensions of guide-wheel-assemblies 461 (e.g., outside diameters of guide-wheels 261), including their affixed placements on second-circular-base (largest-circular-base) 253, may determine the depth-of-rabbet 501, as the guide-wheel-assemblies 461 physically block (obstruct) rabbet-making-means (rabbet-excavating-means) 251 from eating (excavating) any further into drywall 100 material.

Continuing discussing FIG. 2B, in some embodiments, a given bearing 465 may fit within a given guide-wheel 261, and a shaft portion of a given fastener-with-pin-for-wheel/bearing 265 may secure that guide-wheel 261 and bearing 465 combination to a given housing-for-pin 263. In some embodiments, guide-wheel 261 may be a wheel or a caster. In some embodiments, bearing 465 may be a bearing. In some embodiments, an inside (interior) diameter of guide-wheel 261 may be configured to press-fit (frictionally) receive a bearing 465 therein. In some embodiments, combination of guide-wheel 261 with attached bearing 465, may be configured to permit that guide-wheel 261 to freely rotate round that bearing 465. In some embodiments, fastener-with-pin-for-wheel/bearing 265 may be a mechanical fastener, such as, but not limited to, a screw, bolt, pin, dowel, rod, combinations thereof, and/or the like. In some embodiments, fastener-with-pin-for-wheel/bearing 265 may be configured to secure a combination of a guide-wheel 261 with bearing 465 to a given housing-for-pin 263. In some embodiments, housing-for-pin 263 may be a housing that is configured to receive at least a portion of fastener-with-pin-for-wheel/bearing 265. In some embodiments, housing-for-pin 263 may be attached to a bottom of second-circular-base (largest-circular-base) 253. In some embodiments, fastener-for-housing 267 may be a mechanical fastener, such as, but not limited to, a screw, bolt, pin, dowel, rod, combinations thereof, and/or the like. In some embodiments, at least one (1) fastener-for-housing 267 may be used to attach a given housing-for-pin 263 to second-circular-base (largest-circular-base) 253. See e.g., FIG. 2A, FIG. 3, FIG. 4A, and FIG. 4B for fastener-for-housing 267. Continuing discussing FIG. 2B, in some embodiments, when housing-for-pin 263 is attached to the bottom of second-circular-base (largest-circular-base) 253 a length of housing-for-pin 263 may run in a direction that is at least substantially (mostly) parallel to radial line running through common-rotational-axis 299 (see also FIG. 2G).

Continuing discussing FIG. 2B, in some embodiments, hole-saw-with-annular-rabbet-maker 200 may comprise a collar 271 and an arbor (shaft or shank) 275. In some embodiments, collar 271 may be similar in structure, geometry, and/or function to a collar of a prior art hole saw 130; however, collar 271 may also permit attachment of second-circular-base (largest-circular-base) 253 to hole-saw-with-annular-rabbet-maker 200. In some embodiments, collar 271 may be cylindrical member that is rigid and structural. In some embodiments, an axial center of collar 271 may be colinear and/or coincident with common-rotational-axis 299. In some embodiments, collar 271, first-circular-base (smaller-circular-base) 203, cylindrical-sidewall 205, second-circular-base (largest-circular-base) 253, outermost-cylindrical-sidewall 255 may all be concentric and/or coaxial with each other. In some embodiments, collar 271 may be used for securing (attaching) first-circular-base (smaller-circular-base) 203, second-circular-base (largest-circular-base) 253, positioning-drill-bit (centering-drill-bit) 215, and/or discharge-spring 217 together as one assembly (subassembly). In some embodiments, fastener(s) 213 (not visible in FIG. 2B) may be used to secure (attach) first-circular-base (smaller-circular-base) 203 and second-circular-base (largest-circular-base) 253 together as one assembly (sub-assembly). See also, FIG. 2A, FIG. 3, FIG. 4A, and FIG. 4B.

Continuing discussing FIG. 2B, in some embodiments, extending from a bottom and from an axial center of collar 271 may be arbor (shaft or shank) 275. In some embodiments, arbor (shaft or shank) 275 may be an arbor, shaft, shank, rod, dowel, pin, and/or the like. In some embodiments, arbor (shaft or shank) 275 may be configured to have at least a portion of arbor (shaft or shank) 275 fit into a chuck (or the like) of a drill or of an impact driver. In some embodiments, arbor (shaft or shank) 275 may be an elongate member that is solid, rigid, and/or structural. In some embodiments, a length of arbor (shaft or shank) 275 may be linear (straight), fixed, finite, non-variable, and/or predetermined. In some embodiments, a transverse-width cross section through arbor (shaft or shank) 275 may show a 2D (two-dimensional) shape that is a hexagon (with or without rounded corners) (see e.g., FIG. 2G). In some embodiments, a transverse-width cross section through arbor (shaft or shank) 275 may show a 2D shape that is polygonal (with or without rounded corners) or circular.

FIG. 2C depicts a front view of hole-saw-with-annular-rabbet-maker 200 (in its assembled and ready to be used configuration). Note, distinctions of front view, rear (back) view, left-side view, and right-side view may be arbitrary, as much of hole-saw-with-annular-rabbet-maker 200 may have rotational symmetry. FIG. 2C shows that fixed placement and fixed dimensions of guide-wheel(s) 261 only permits a predetermined, fixed, finite, and non-variable depth-of-rabbet 501 in drywall 100; i.e., the fixed placement and fixed dimensions of guide-wheel(s) 261 permits rabbet-making-means (rabbet-excavating-means) 251 to dig into drywall 100 only so far, resulting in depth-of-rabbet 501 in drywall 100. In some embodiments, a height (tallness) of interior-rabbet-making-means 259 may be at least substantially (mostly) identical to a height (tallness) of outermost-cylindrical-sidewall 255. See e.g., FIG. 2C through FIG. 2F. In some embodiments, a length of positioning-drill-bit (centering-drill-bit) 215 may be longer than a height (tallness) of cylindrical-sidewall 205 (see e.g., FIG. 2C through FIG. 2F). In some embodiments a terminal tip of positioning-drill-bit (centering-drill-bit) 215 (disposed away from first-circular-base (smaller-circular-base) 203) may extend beyond (past) the height of cylindrical-sidewall 205 (see e.g., FIG. 2C through FIG. 2F). In some embodiments, for a given (particular) embodiment of hole-saw-with-annular-rabbet-maker 200, a height and/or a diameter of cylindrical-sidewall 205 and/or of outermost-cylindrical-sidewall 255 is fixed, finite, non-variable, predetermined, combinations thereof, and/or the like. See e.g., FIG. 2C through FIG. 2F. In some embodiments, a height of cylindrical-sidewall 205 may be more than a height of outermost-cylindrical-sidewall 255. In some embodiments, the height of cylindrical-sidewall 205 may be at least three (3) to five (5) times more (taller) than the height of outermost-cylindrical-sidewall 255. See e.g., FIG. 2C through FIG. 2F.

FIG. 2D depicts a rear (back) view of hole-saw-with-annular-rabbet-maker 200 (in its assembled and ready to be used configuration). FIG. 2D may be at least a substantially (mostly) opposing view as compared to FIG. 2C.

FIG. 2E depicts a left-side view of hole-saw-with-annular-rabbet-maker 200 (in its assembled and ready to be used configuration). FIG. 2F depicts a right-side view of hole-saw-with-annular-rabbet-maker 200 (in its assembled and ready to be used configuration). FIG. 2F may be at least a substantially (mostly) opposing view as compared to FIG. 2E.

For example, and without limiting the scope of the present invention, such as shown in FIG. 2C to FIG. 2F, in some embodiments, outermost-cylindrical-sidewall 255 may be without any through hole(s), aperture(s), slot(s), and/or the like in its sidewall so as to better contain dust and/or drywall particulate matter when at least some portions of hole-saw-with-annular-rabbet-maker 200 (tool 200) may be actively engaged against a given section of drywall 100. Whereas, in other embodiments, outermost-cylindrical-sidewall 255 may have at least one through hole(s), aperture(s), slot(s), and/or the like in its sidewall.

FIG. 2G depicts a bottom view of hole-saw-with-annular-rabbet-maker 200 (in its assembled and ready to be used configuration). In some embodiments, when a given housing-for-pin 263 may be attached to a bottom of second-circular-base (largest-circular-base) 253 (e.g., via fastener-for-housing 267 and aperture-for-fastener 467), a length of that given attached housing-for-pin 263 may point to common-rotational-axis 299 and/or may be parallel with a radial line running linearly to common-rotational-axis 299. See FIG. 4A for aperture-for-fastener 467.

Continuing discussing FIG. 2G, in some embodiments, when a given housing-for-pin 263 may be attached to a bottom of second-circular-base (largest-circular-base) 253 (e.g., via fastener-for-housing 267 and aperture-for-fastener 467), that given attached housing-for-pin 263 may be located closer to outermost-cylindrical-sidewall 255 (and/or to outermost-cutting-means 257) than to common-rotational-axis 299. In some embodiments, when a given housing-for-pin 263 may be attached to a bottom of second-circular-base (largest-circular-base) 253 (e.g., via fastener-for-housing 267 and aperture-for-fastener 467), that given attached housing-for-pin 263 may be located further away from common-rotational-axis 299 than to outermost-cylindrical-sidewall 255 (and/or to outermost-cutting-means 257).

FIG. 2H depicts a top view of hole-saw-with-annular-rabbet-maker 200 (in its assembled and ready to be used configuration). FIG. 2H may be at least a substantially (mostly) opposing view as compared to FIG. 2G. In some embodiments, for a given (particular) embodiment of hole-saw-with-annular-rabbet-maker 200, a thickness of cylindrical-sidewall 205 and/or of outermost-cylindrical-sidewall 255 is fixed, finite, non-variable, predetermined, combinations thereof, and/or the like.

Continuing discussing FIG. 2H, in some embodiments, each individual interior-rabbet-making-means 259, innermost-interior-rabbet-making-means 259*a*, middle-interior-rabbet-making-means 259*b*, and/or outermost-interior-rabbet-making-means 259*c* may have a fixed, finite, predetermined, and/or non-variable length. In some embodiments, the length of each individual interior-rabbet-making-means 259, innermost-interior-rabbet-making-means 259*a*, middle-interior-rabbet-making-means 259*b*, and/or outermost-interior-rabbet-making-means 259*c* may not be entirely linear (straight). In some embodiments, the length of each individual interior-rabbet-making-means 259, innermost-interior-rabbet-making-means 259*a*, middle-interior-rabbet-making-means 259*b*, and/or outermost-interior-rabbet-making-means 259*c* may be at least substantially (mostly) identical (the same). In some embodiments, the length of each individual interior-rabbet-making-means 259, innermost-interior-rabbet-making-means 259*a*, middle-interior-rabbet-making-means 259*b*, and/or outermost-interior-rabbet-making-means 259*c* may be less than a linear shortest distance between cylindrical-sidewall 205 and outermost-cylindrical-sidewall 255. See e.g., FIG. 2H.

Continuing discussing FIG. 2H, in some embodiments, each individual interior-rabbet-making-means 259, innermost-interior-rabbet-making-means 259*a*, middle-interior-rabbet-making-means 259*b*, and/or outermost-interior-rabbet-making-means 259*c* may have a fixed, finite, predetermined, and/or non-variable radius of curvature along their length. In some embodiments, this radius of curvature may be identical for each individual interior-rabbet-making-means 259, innermost-interior-rabbet-making-means 259*a*, middle-interior-rabbet-making-means 259*b*, and/or outermost-interior-rabbet-making-means 259*c*. In some embodiments, this radius of curvature of each individual interior-rabbet-making-means 259, innermost-interior-rabbet-making-means 259*a*, middle-interior-rabbet-making-means 259*b*, and/or outermost-interior-rabbet-making-means 259*c* may not be concentric with a radius of curvature of cylindrical-sidewall 205 nor of outermost-cylindrical-sidewall 255. See e.g., FIG. 2H.

Continuing discussing FIG. 2H, in some embodiments, none of the individual interior-rabbet-making-means 259, innermost-interior-rabbet-making-means 259*a*, middle-interior-rabbet-making-means 259*b*, outermost-interior-rabbet-making-means 259*c* touch each other; however, when hole-saw-with-annular-rabbet-maker 200 is assembled (as intended and as shown) and rotating (spinning) then the interior-rabbet-making-means 259, innermost-interior-rabbet-making-means 259*a*, middle-interior-rabbet-making-means 259*b*, outermost-interior-rabbet-making-means 259*c* provide 100% full and/or entire cutting, sawing, grinding, abrading, chipping, and/or the like coverage over the surface area of second-circular-base (largest-circular-base) 253. See e.g., FIG. 2H.

Continuing discussing FIG. 2H, in some embodiments, interior-rabbet-making-means 259, innermost-interior-rabbet-making-means 259*a*, middle-interior-rabbet-making-means 259*b*, and/or outermost-interior-rabbet-making-means 259*c* may be attached to (affixed to) a top surface of second-circular-base (largest-circular-base) 253 by welding. See also FIG. 2G, where traces of such welding may be shown on a bottom surface side of second-circular-base (largest-circular-base) 253.

Figure 3:
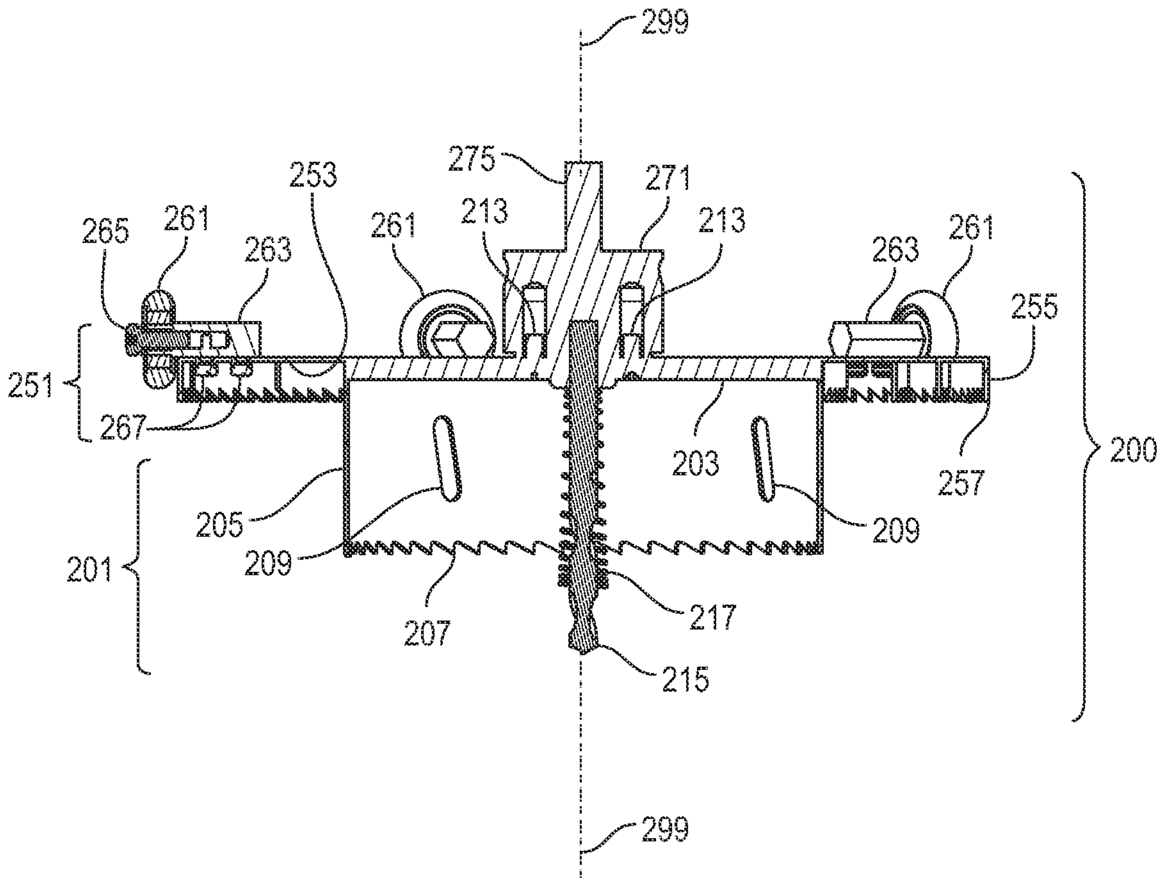
FIG. 3 depicts a cross-sectional view of hole-saw-with-annular-rabbet-maker from FIG. 2A (e.g., from top to bottom and through a common-rotational-axis of the hole-saw-with-annular-rabbet-maker from FIG. 2A).

FIG. 3 depicts a cross-sectional view of hole-saw-with-annular-rabbet-maker 200 (e.g., from top to bottom and through the common-rotational-axis 299 of hole-saw-with-annular-rabbet-maker 200). This cross-sectional view shows how fastener(s) 213 may be used to secure (attach) first-circular-base (smaller-circular-base) 203 and second-circular-base (largest-circular-base) 253 to collar 271 in some embodiments. This cross-sectional view shows how fastener-with-pin-for-wheel/bearing 265 may be used to secure (attach) a guide-wheel 261 and its bearing 465 to its housing-for-pin 263 in some embodiments. This cross-sectional view shows how fastener-for-housing 267 may be used to secure (attach) housing-for-pin 263 to a bottom of second-circular-base (largest-circular-base) 253 in some embodiments. This cross-sectional view shows how a height (tallness) of interior-rabbet-making-means 259 may be at least substantially (mostly) identical to a height (tallness) of outermost-cylindrical-sidewall 255 in some embodiments. This cross-sectional view shows how a base of positioning-drill-bit (centering-drill-bit) 215 may be embedded within collar 271 in some embodiments.

FIG. 4A depicts a bottom exploded view of hole-saw-with-annular-rabbet-maker 200. FIG. 4A shows how a given guide-wheel-assembly 461 may be assembled with respect to a bottom of second-circular-base (largest-circular-base) 253, in some embodiments. From this bottom exploded view, at least some of the housings-for-pins 263 and their fasteners-for-housings 267 are shown detached from a bottom of the second-circular-base (largest-circular-base) 253, which reveals apertures-for-fasteners 467 in the bottom of second-circular-base (largest-circular-base) 253, in some embodiments. In some embodiments, a given aperture-for-fastener 467 may be hole and/or an aperture accessible from the bottom of the second-circular-base (largest-circular-base) 253. In some embodiments, a given aperture-for-fastener 467 may be a cavity, a hollow cavity, a cylindrical cavity, a substantially cylindrical cavity, a cavity that is open on both ends, combinations thereof, and/or the like. In some embodiments, a at least some of interior surfaces of a given aperture-for-fastener 467 may be female threaded. In some embodiments, at least some of a given aperture-for-fastener 467 may be configured to received at least a portion of a given fastener-for-housing 267; and, for a purpose of securing (attaching) a given housing-for-pin 263 to the bottom of the second-circular-base (largest-circular-base) 253.

FIG. 4B depicts an exploded view from a side of hole-saw-with-annular-rabbet-maker 200. In some embodiments, fasteners-for-housings 267 may get installed from a top (upper) side of second-circular-base (largest-circular-base) 253, with a portion of the fasteners-for-housings 267 passing through second-circular-base (largest-circular-base) 253 (e.g., through aperture-for-fastener 467) and into the housing-for-pin 263, which may be located on the backside of second-circular-base (largest-circular-base) 253.

FIG. 5A depicts a bottom perspective view of a section (portion) of drywall 100 where hole-saw-with-annular-rabbet-maker 200 has completed operating thereon (as intended) to generate a through-hole 110 within that given section (portion) of drywall 100 and an immediately surround a perimeter (circumference) of that through-hole 110, a rabbet 500 (annular-rabbet 500) within that same section (portion) of drywall 100. In some embodiments, FIG. 5A shows an output of hole-saw-with-annular-rabbet-maker 200 operating as intended on the section (portion) of drywall 100. In some embodiments, rabbet 500 may be an annular (ring) region of drywall 100, immediately surrounding through-hole 110 and from a direction of only one exterior surface of drywall 100, where drywall 100 material has been removed (excavated), to leave behind an annular (ring) shaped recessed ledge, surface, and/or lip within an interior region of that drywall 100 around that through-hole 110 and to a depth-of-rabbet 501. In some embodiments, depth-of-rabbet 501 may be a depth of the rabbet 500 from a closest exterior surface of drywall 100 (that has not been cut or removed) to the bottom surface of rabbet 500. In some embodiments, depth-of-rabbet 501 may be a linear dimension that is fixed, predetermined, finite, and/or non-variable. In some embodiments, diameter-of-rabbet 502 may be a diameter of rabbet 500. Note, diameter-of-rabbet 502 is shown and called out in FIG. 5B. In some embodiments, diameter-of-rabbet 502 may be outermost diameter of annular-rabbet 500; and diameter 111 of through-hole 110 may coincide with an innermost (inside) diameter of annular-rabbet 500. In some embodiments, diameter-of-rabbet 502 may be a linear dimension that is fixed, predetermined, finite, and/or non-variable. In some embodiments, diameter-of-rabbet 502, diameter 111, and through-hole 110 may be concentric with each other (e.g., when made by a given hole-saw-with-annular-rabbet-maker 200).

Continuing discussing FIG. 5A, in some embodiments, through-hole 110 may be formed by rotational (spinning) use of at least a portion of hole-saw-with-annular-rabbet-maker 200 against the section (portion) of drywall 100. In some embodiments, through-hole 110 may be formed by rotational (spinning) use of cylindrical-sidewall 205 and/or hole-cutting-means 207 against the section (portion) of drywall 100.

Continuing discussing FIG. 5A, in some embodiments, rabbet 500 is formed by rotational (spinning) use of at least some region of hole-saw-with-annular-rabbet-maker 200 against the section (portion) of drywall 100. In some embodiments, rabbet 500 is formed by rotational (spinning) use of rabbet-making-means (rabbet-excavating-means) 251. In some embodiments, rabbet 500 is formed by rotational (spinning) use of outermost-cylindrical-sidewall 255, outermost-cutting-means 257, interior-rabbet-making-means 259, innermost-interior-rabbet-making-means 259*a*, middle-interior-rabbet-making-means 259*b*, outermost-interior-rabbet-making-means 259*c*, interior-rabbet-making-means 859, portions thereof, combinations thereof, and/or the like.

Continuing discussing FIG. 5A, in some embodiments, (outermost) diameter-of-rabbet 502 may be determined by a diameter of second-circular-base (largest-circular-base) 253 and/or of outermost-cutting-means 257. In some embodiments, innermost (inside) diameter of annular-rabbet 500 may coincide with diameter 111 of through-hole 110 and this innermost (inside) diameter of annular rabbet 500 may be determined and formed by cylindrical-sidewall 205 and hole-cutting-means 207 of hole-saw 201. In some embodiments, a given hole-saw-with-annular-rabbet-maker 200 may be manufactured such that a particular sized diameter-of-rabbet 502 results to fit therein an outermost outside diameter of a given flange 701 of a given spackle-frame 700. See also, FIG. 5B, FIG. 6A, FIG. 6B, FIG. 7A, and FIG. 7B for spackle-frame 700.

Continuing discussing FIG. 5A, in some embodiments, depth-of-rabbet 501 may be determined by a depth (height) of outermost-cylindrical-sidewall 255, outermost-cutting-means 257, interior-rabbet-making-means 259, innermost-interior-rabbet-making-means 259*a*, middle-interior-rabbet-making-means 259*b*, outermost-interior-rabbet-making-means 259*c*, and/or interior-rabbet-making-means 859, and/or by positional placement and sizing of guide-wheel-assemblies 461. In some embodiments, a given hole-saw-with-annular-rabbet-maker 200 may be manufactured such that a particular sized depth-of-rabbet 501 is the same or larger than a thickness of flange 701 of a given spackle-frame 700. In some embodiments, a given hole-saw-with-annular-rabbet-maker 200 may be manufactured such that a particular sized depth-of-rabbet 501 results to fit therein a thickness of flange 701 of a given spackle-frame 700. See e.g., FIG. 6A, FIG. 6B, FIG. 7A, and FIG. 7B for spackle-frame 700.

Note, FIG. 5A is similar to prior art FIG. 1B, except that FIG. 1B has no rabbet 500 because the through-hole 110 in FIG. 1B was made with an ordinary prior art hole saw 130 and not with a hole saw that has an integrated annual rabbet maker like hole-saw-with-annular-rabbet-maker 200.

Figure 5B:
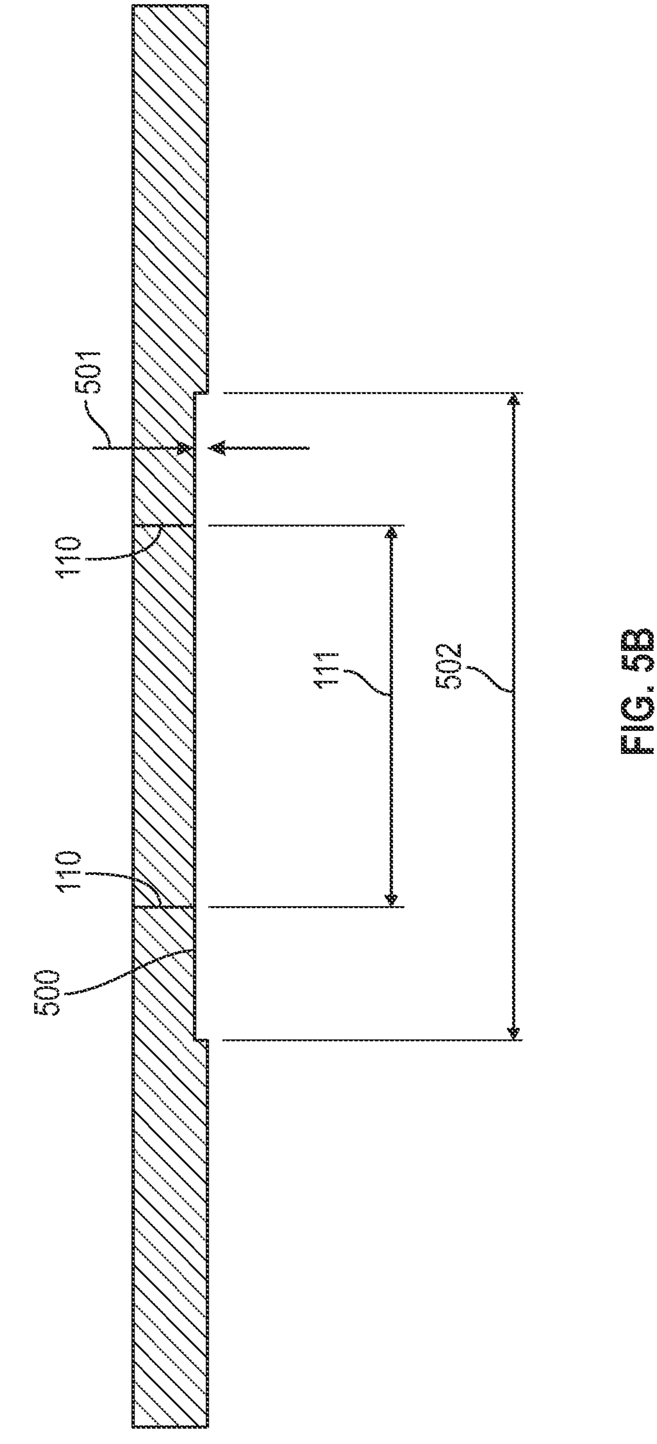
FIG. 5B depicts a cross-sectional perspective view of a section (portion) of drywall where the hole-saw-with-annular-rabbet-maker from FIG. 2A has completed operating thereon (as intended) to generate a through-hole within that given section (portion) of drywall and has also generated immediately surrounding a perimeter (circumference) of that through-hole, an annular-rabbet within that same section (portion) of drywall.

FIG. 5B depicts a cross-sectional perspective view of a section (portion) of drywall 100 where hole-saw-with-annular-rabbet-maker 200 has completed operating thereon (as intended) to generate a through-hole 110 within that given section (portion) of drywall 100 and an immediately surround a perimeter (circumference) of that through-hole 110, a rabbet 500 within that same section (portion) of drywall 100. In some embodiments, FIG. 5B shows an output of hole-saw-with-annular-rabbet-maker 200 operating as intended on the section (portion) of drywall 100, that results in through-hole 110 and rabbet 500. In some embodiments, depth-of-rabbet 501 may be the same and/or uniform everywhere in its rabbet 500.

Figure 6A:
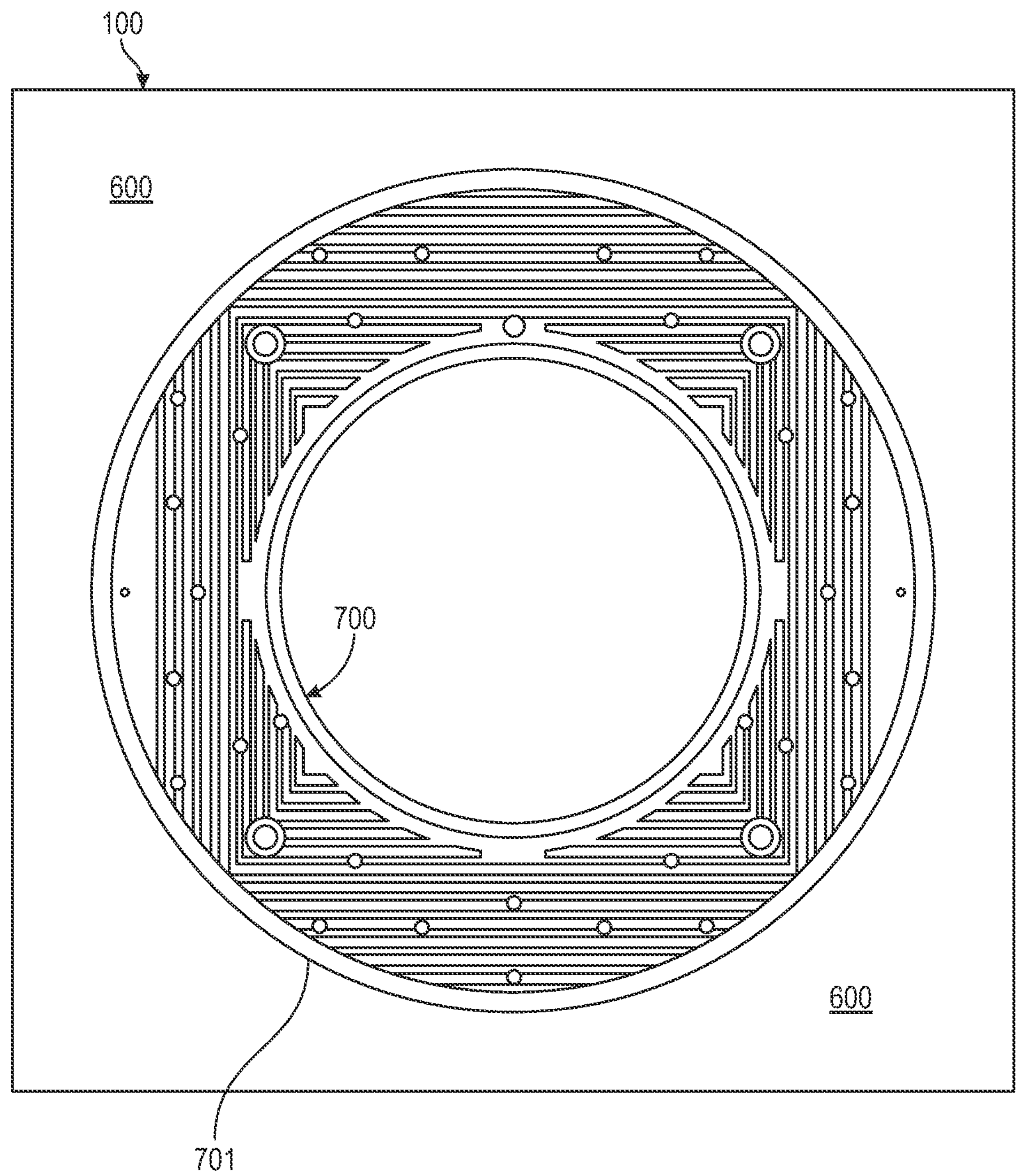
FIG. 6A depicts a bottom view of a section (portion) of drywall where the hole-saw-with-annular-rabbet-maker from FIG. 2A has completed operating thereon (as intended) to generate a through-hole and its directly associated annular-rabbet, and wherein a flange of a given spackle-frame has been installed (inlaid and/or fitted) into that annular-rabbet in the section of the drywall.

FIG. 6A depicts a bottom view of a section (portion) of drywall 100 where hole-saw-with-annular-rabbet-maker 200 has completed operating thereon (as intended) to generate a through-hole 110 and its associated rabbet 500 (annular-rabbet 500), and wherein a flange 701 of a given spackle-frame 700 has been installed (inlaid and/or fitted) into that rabbet 500. Note, because the flange 701 of the given spackle-frame 700 has been installed (fitted) into the rabbet 500, that rabbet 500 may not be very visible in FIG. 6A; i.e., an observer located below that given section (portion) of drywall 100, with its through-hole 110 and its rabbet 500, and where the flange 701 of the given spackle-frame 700 has been installed (fitted) into that rabbet 500, may not be able to see that rabbet 500 because that flange 701 will cover over that rabbet 500. (However, some portions of that rabbet 500 may be visible if that flange 701 has through holes in it.) FIG. 6A also shows a bottom exterior-surface 600 of the section of drywall 100. The rabbet 500 and the through-hole 110 in that section of drywall 100 are made from that bottom exterior-surface 600 side of the section of drywall 100 and not from the other side of the drywall 100 (which is not visible in FIG. 6A). In some embodiments, tool 200 is used from bottom exterior-surface 600 of the section of drywall 100 (which is generally going to be readily accessible for the installer [person]).

Figure 6B:
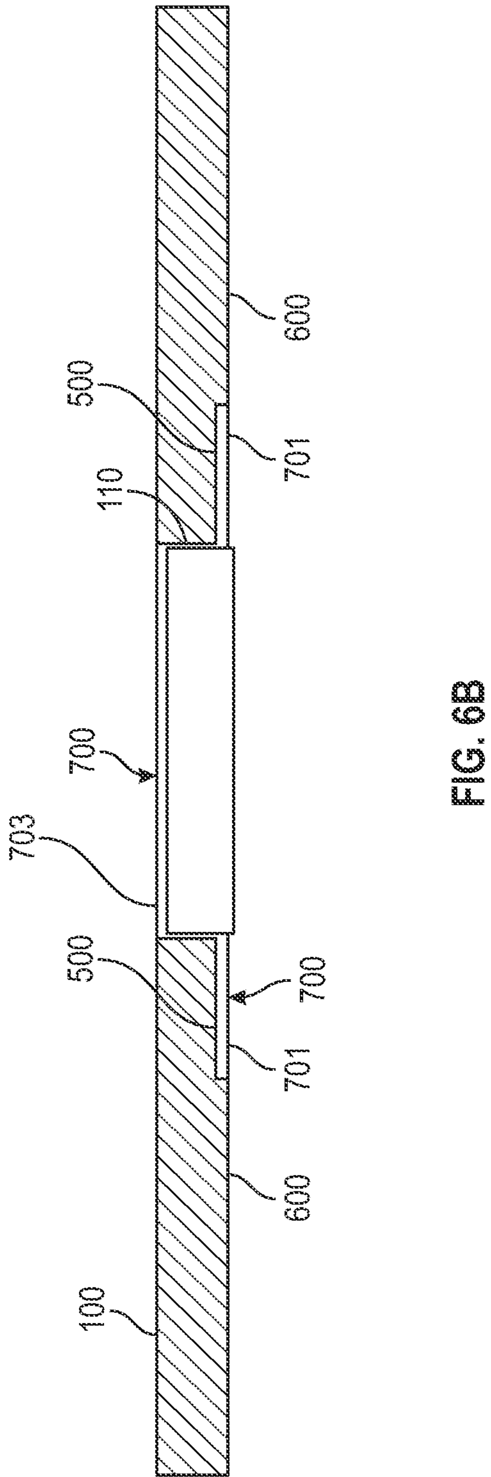
FIG. 6B depicts a cross-sectional view of a section (portion) of drywall where the hole-saw-with-annular-rabbet-maker from FIG. 2A has completed operating thereon (as intended) to generate a through-hole and its directly associated annular-rabbet, and wherein a flange of a given spackle-frame has been installed (inlaid and/or fitted) into that annular-rabbet within the section of drywall.

FIG. 6B depicts a cross-sectional view of a section (portion) of drywall 100 where hole-saw-with-annular-rabbet-maker 200 has completed operating thereon (as intended) to generate a through-hole 110 and its associated rabbet 500, and wherein a flange 701 of a given spackle-frame 700 has been installed (inlaid and/or fitted) into that rabbet 500.

In some embodiments, when a flange 701 of a given spackle-frame 700 has been installed (inlaid) within the rabbet 500 of drywall 100, and a cylindrical-side-wall 703 portion of that spackle-frame 700 has been installed in the through-hole 110 of that given section (portion) of drywall 100, e.g., as shown in FIG. 6B, then at least some bottom exterior surface(s) of flange 701 and a bottom exterior-surface 600 of that given section (portion) of drywall 100 may be at least substantially (mostly) flush with each other. In some embodiments, when at least some bottom exterior surface(s) of flange 701 and the bottom exterior-surface 600 of that given section (portion) of drywall 100 may be at least substantially (mostly) flush with each other, e.g., as shown in FIG. 6B, then joint compound (mud) may be applied to both the bottom exterior surfaces of flange 701 and to the bottom exterior-surface 600 of that given section (portion) of drywall 100 such that there is no visible trim as viewed from below and there is no visible hump (lump) of joint compound material over the flange 701 as compared to the adjacent bottom exterior-surface 600 of drywall 100, which is the problem that occurs in the prior art (see e.g., FIG. 1D). Compare FIG. 1D against FIG. 6B.

In some embodiments, a pot light or ceiling recessed light may be installed in a ceiling line (plane), such that at least most of the lighting mechanisms may be hidden from view (with respect to an observer located below that given ceiling), except for possibly a lens, reflector, and/or the element that actually generates the light. Of course, such a pot light or recessed ceiling light may also be installed in a wall. In some embodiments, such a pot light or a ceiling recessed light install, may be with a can (hidden on the other side of the drywall) or canless (without a can). A "can" in this context may be an electrical junction box configured for use with a lighting module. In some embodiments, such a pot light or a ceiling recessed light install, may be with trim or trimless (trim-less) (without visible trim). "Trim" in this context may refer to an annular ring of material that is located below a bottom exterior surface of the (ceiling) drywall and around the reflector and lens (if any) of the lighting module. Emitted light (from the light generating means [e.g., a LED]) typically exits and/or shines down through the volume of air space that the annular material of the trim surrounds. For at least some pot light or a ceiling recessed light installs, a trimless aesthetic may be desired, called for, needed, and/or used. Such trimless installs typically use some form of a spackle frame, such as, but not limited to, spackle-frame 700.

Figure 7A:
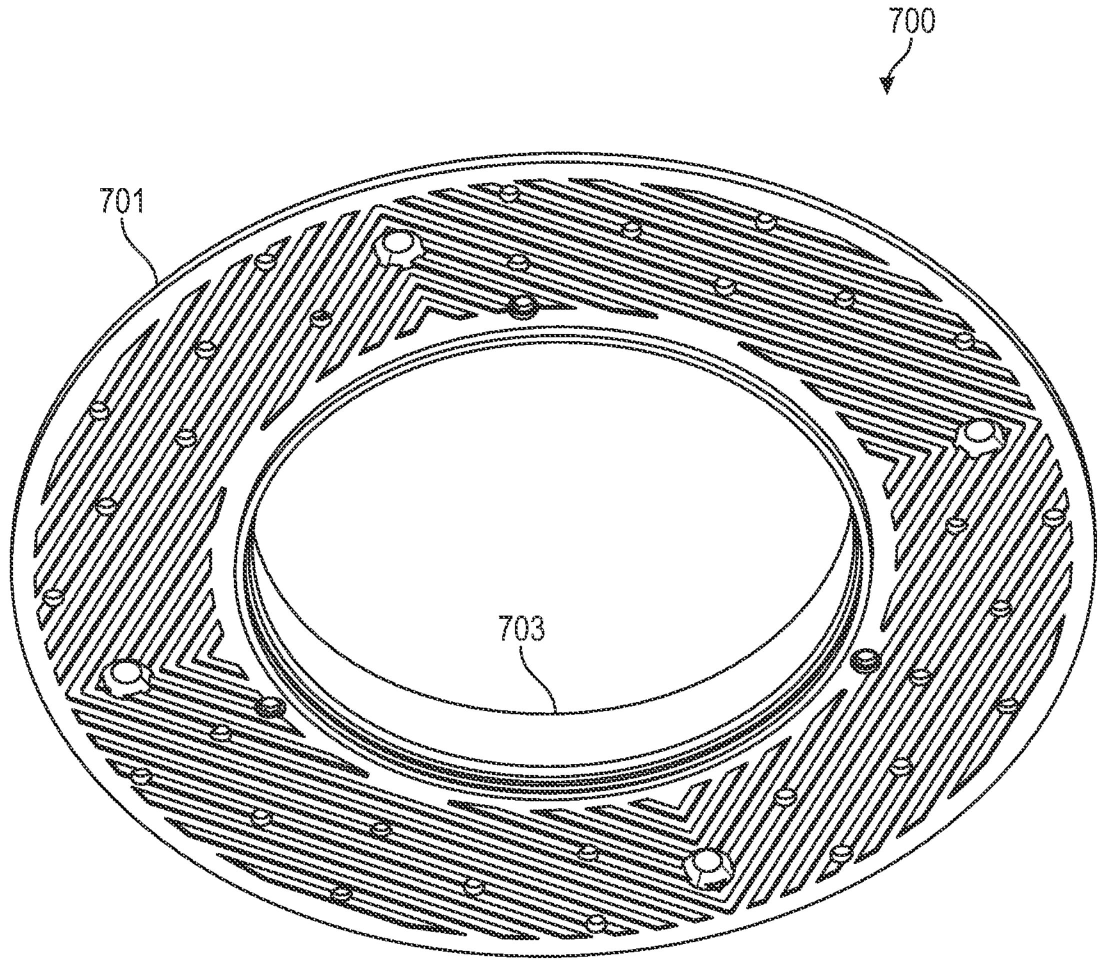
FIG. 7A depicts a bottom perspective view of an example spackle-frame and showing its flange from that bottom perspective view.
Figure 7B:
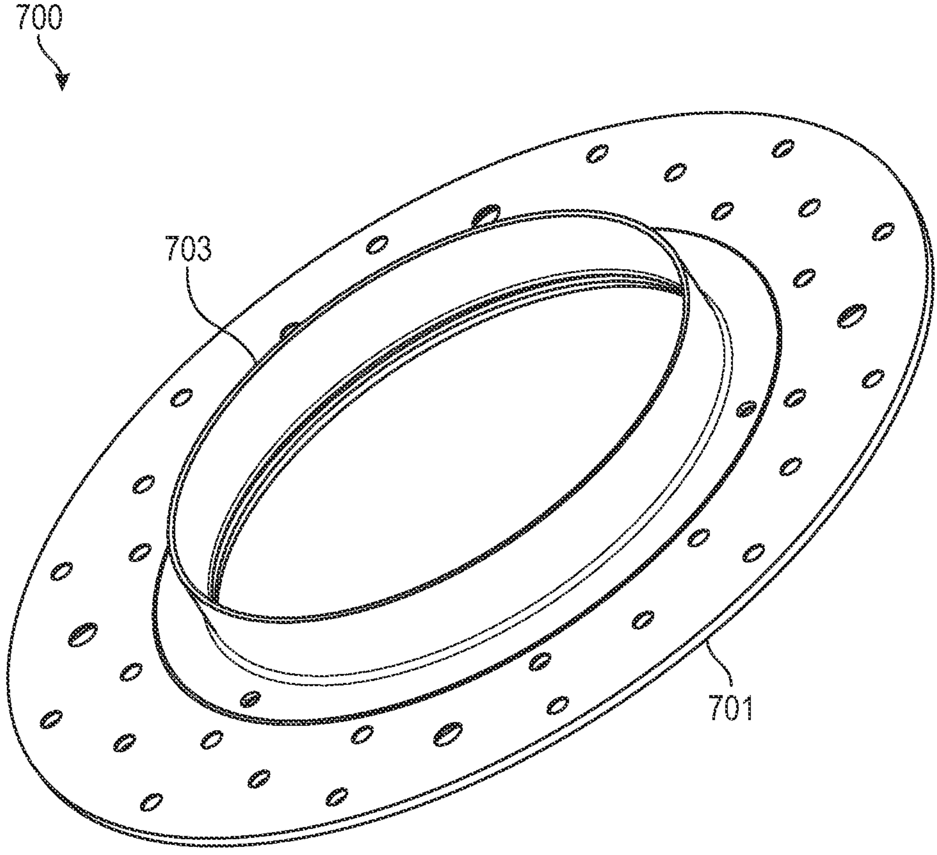
FIG. 7B depicts a top perspective view of an example spackle-frame and showing its flange and its cylindrical-side-wall from that top perspective view.

FIG. 7A depicts a bottom perspective view of an example spackle-frame 700 and showing its flange 701 from that bottom perspective view. FIG. 7B depicts a top perspective view of an example spackle-frame 700 and showing its flange 701 from that top perspective view. FIG. 7B also shows the cylindrical-side-wall 703 region of that spackle-frame 700. Diameter 111 of through-hole 110 in the section of drywall 100 may be configured to fit at least a portion of cylindrical-side-wall 703 within that diameter 111. In some embodiments, a given hole-saw 201 of tool 200 may be manufactured such that diameter 111 of through-hole 110 that the given hole-saw 201 makes is sized to fit a given cylindrical-side-wall 703 within that diameter 111. In some embodiments, spackle-frame 700 may be used in drywall lighting installs where a trimless aesthetic may be desired. In some embodiments, spackle-frame 700 may be used in ceiling drywall lighting installs where a trimless aesthetic may be desired. In some embodiments, spackle-frame 700 may be used in wall drywall lighting installs where a trimless aesthetic may be desired. In some embodiments, spackle-frame 700 may be used in drywall lighting installs where a trimless aesthetic may be desired for a given installed lighting module, such as, but not limited to, a LED (light emitting diode) lighting module. See also, U.S. utility U.S. Pat. No. 11,662,084, with respect to its references to its "spackle-frame 201." The disclosure and teachings of U.S. utility U.S. Pat. No. 11,662,084 are incorporated by reference herein.

Figure 8:
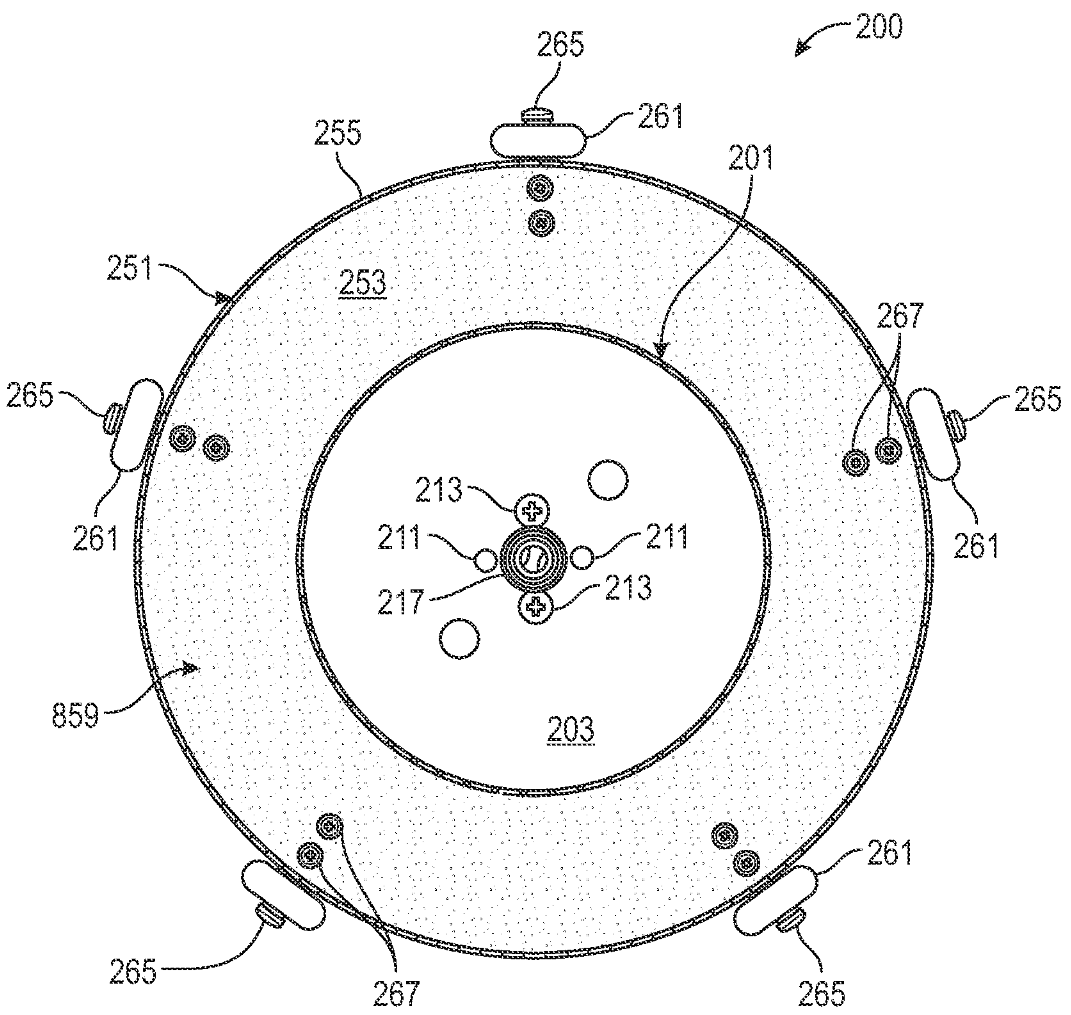
FIG. 8 depicts a top view of a hole-saw-with-annular-rabbet-maker (in its assembled and ready to be used configuration), according to an additional and/or an alternative embodiment.

FIG. 8 depicts a top view of hole-saw-with-annular-rabbet-maker 200 (in its assembled and ready to be used configuration), according to an additional and/or an alternative embodiment. In some embodiments, interior-rabbet-making-means 259 may be interior-rabbet-making-means 859. In some embodiments, interior-rabbet-making-means 259 may comprise interior-rabbet-making-means 859. In some embodiments, rabbet-making-means (rabbet-excavating-means) 251 may comprise interior-rabbet-making-means 859. In some embodiments, innermost-interior-rabbet-making-means 259*a*, middle-interior-rabbet-making-means 259*b*, and/or outermost-interior-rabbet-making-means 259*c* may be replaced with interior-rabbet-making-means 859. In some embodiments, interior-rabbet-making-means 859 may be used along with innermost-interior-rabbet-making-means 259*a*, middle-interior-rabbet-making-means 259*b*, and/or outermost-interior-rabbet-making-means 259*c*. In some embodiments, interior-rabbet-making-means 859 may be at least some top (upper) surface of second-circular-base (largest-circular-base) 253 may be covered in grinders, abrasives, rasps, files, sandpaper, portions thereof, combinations thereof, and/or the like. In some embodiments, interior-rabbet-making-means 859 may be one or more of a grinder, an abrasive, a rasp, a file, sandpaper, portions thereof, combinations thereof, and/or the like. In some embodiments, when rabbet-making-means (rabbet-excavating-means) 251 may be rotating (spinning) interior-rabbet-making-means 859 may be configured to eat away, grind down, erode, excavate, remove, break away, file down, rasp down, abrade, sand down, combinations thereof, and/or the like drywall 100 material.

In some embodiments, hole-saw-with-annular-rabbet-maker (or tool) 200, hole-saw 201, rabbet-making-means (rabbet-excavating-means) 251, outermost-cutting-means 257, and/or interior-rabbet-making-means 859 may be configured to be used in oscillating tools (multi-tools) in addition to or as an alternative to handheld drill 900 and/or a handheld impact driver 900. In some embodiments, hole-saw-with-annular-rabbet-maker (or tool) 200, hole-saw 201, rabbet-making-means (rabbet-excavating-means) 251, outermost-cutting-means 257, and/or interior-rabbet-making-means 859 may be configured to operate in an oscillating (vibratory) manner, instead of a rotary manner, that may be imparted to via a removable connection to a given oscillating tool (multi-tool). For example, and without limiting the scope of the present invention, such oscillating tools (multi-tools) may be selected from: DEWALT 20V Max XR Oscillating Multi-Tool or the like.

Figure 9:
FIG. 9 is a prior art drawing of a generic handheld drill and/or a handheld impact driver.
Figure 9:
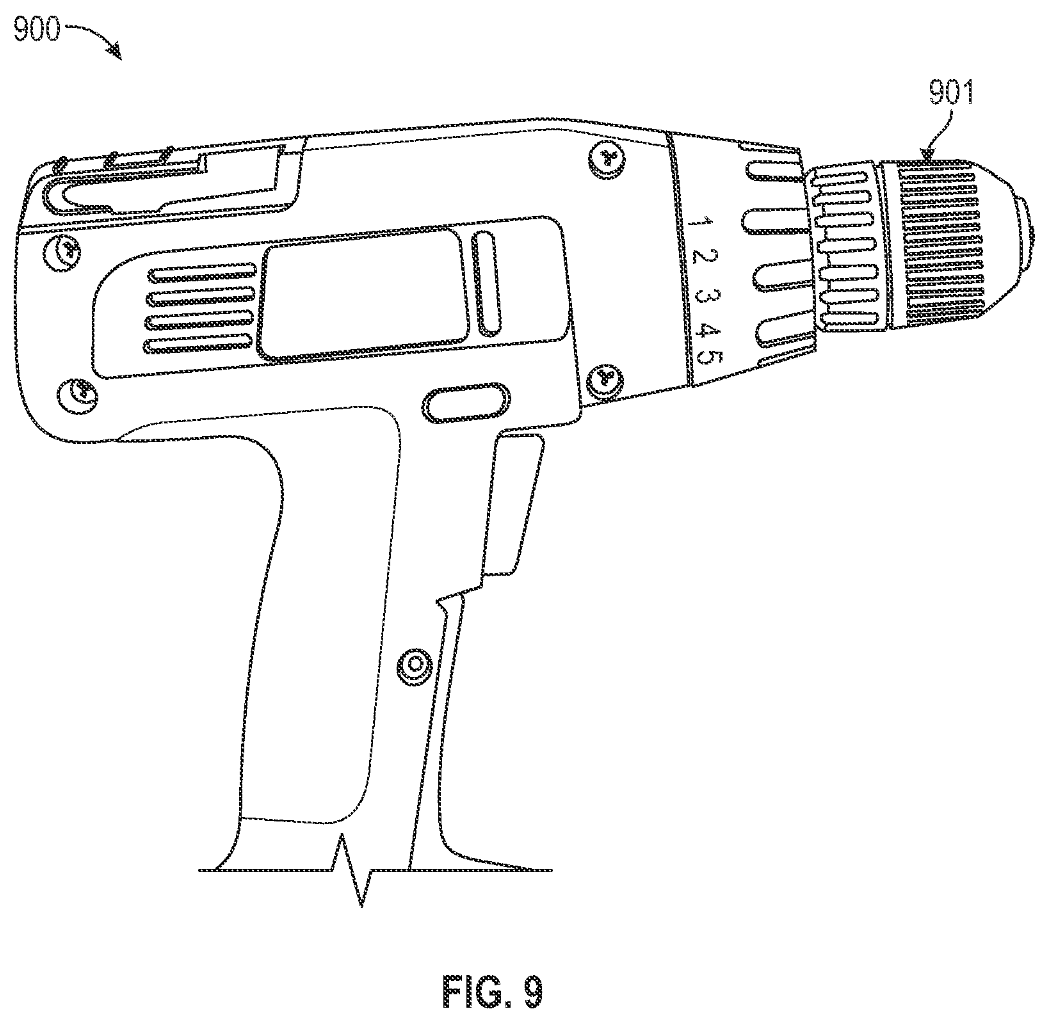

FIG. 9 is a prior art drawing of a generic handheld drill 900 and/or a handheld impact driver 900. The handheld drill 900 and/or handheld impact driver 900 may be electrically powered, either with a wired connection or via a (rechargeable) battery. A given handheld drill 900 and/or handheld impact driver 900 may operate at different and/or variable speeds, power settings, and/or gear ratios (clutch settings). The handheld drill 900 and/or handheld impact driver 900 has a chuck 901 (or the like) that is configured to removably receive and attach to various arbors (e.g., arbor 275), shafts, shanks, and/or of like of various drill bits, hole saws, driver bits, tools 200, and/or the like. Chucks 901 may be keyless or keyed. Such prior art handheld drills 900 and/or handheld impact drivers 900 are extremely commonly used in residential construction, commercial construction, residential repair, and in do-it-yourself (DYI) construction industries, including use in lighting installs, are readily available from multiple retailers (online and/or brick and mortar); and are extremely well documented and understood. Common brands regularly available in the U.S. for such prior art handheld drills 900 and/or handheld impact drivers 900 include, but are not limited to, DEWALT, MILWAUKEE, MAKITA, RYOBI, RIGID, BOSCH, METABO, CRAFTSMAN, SKIL, BLACK AND DECKER, FEIN, BAUER, HERCULES, and PORTER-CABLE. Such prior art teachings of handheld drills 900 and/or handheld impact drivers 900 are included by reference herein.

In some embodiments, hole-saw-with-annular-rabbet-maker 200 may be tool 200. In some embodiments, tool 200 may be configured to generate through-hole 110 in a section of drywall 100 and may also be configured to remove some drywall-material around a circumference of that through-hole 110 resulting in annular-rabbet 500 in the section of drywall 100 directly around the through-hole 110. See e.g., FIG. 2A, FIG. 5A, and FIG. 5B.

In some embodiments, tool 200 may comprise hole-saw 201 and rabbet-making-means 251. In some embodiments, in the assembled configuration of tool 200, at least some of the rabbet-making-means 251 may (entirely) radially surround an outermost diameter of hole-saw 201 (of cylindrical-sidewall 205). In some embodiments, hole-saw 201 may be configured to generate through-hole 110 within the section of drywall 100. In some embodiments, rabbet-making-means 251 may be configured to generate annular-rabbet 500. See e.g., FIG. 2A, FIG. 5A, and FIG. 5B.

In some embodiments, annular-rabbet 500 in the section of the drywall 100 is configured to fit a flange 701 of a spackle-frame 700 within that annular-rabbet 500. See e.g., FIG. 5A to FIG. 7B.

In some embodiments, when flange 701 of spackle-frame 700 may be inlaid (installed) within annular-rabbet 500, a bottom exterior-surface 600 of that section of drywall 100 may be at least substantially (mostly) flush with at least some of a bottom exterior surface of flange 701. See e.g., FIG. 6B.

In some embodiments, tool 200 may comprise collar 271. In some embodiments, collar 271 may be attached (secured) to a bottom surface of the rabbet-making-means 251 (second-circular-base (largest-circular-base) 253). See e.g., FIG. 2B through FIG. 2G, FIG. 3, and FIG. 4B.

In some embodiments, tool 200 may comprise arbor 275. In some embodiments, a portion of arbor 275 may be attached (secured) to collar 271 and a different portion of arbor 275 may be configured to be removably attached to chuck 901 of (handheld) drill 900 or of impact driver 900. See e.g., FIG. 2B through FIG. 2G, FIG. 3, FIG. 4B, and FIG. 9.

In some embodiments, when chuck 901 may be removably attached to arbor 275, the drill 900 or the impact driver 900 may provide motive rotational force for tool 200 to accomplish a rotational maneuver against the section of the drywall 100, resulting in generation of both annular-rabbet 500 and the through-hole in the section of the drywall 100. See e.g., FIG. 2A, FIG. 5A, and FIG. 5B.

In some embodiments, rabbet-making-means 251 may comprise: larger-circular-base 253 (second-circular-base (largest-circular-base) 253), outermost-cylindrical-sidewall 255, outermost-cutting-means 257, and interior-rabbet-making-means 259 (and/or 859). In some embodiments, larger-circular-base 253 (second-circular-base (largest-circular-base) 253) may be larger (in diameter) than a smaller-circular-base 203 (first-circular-base (smaller-circular-base) 203) of hole-saw 201. In some embodiments, larger-circular-base 253 and/or smaller-circular-base 203 may be rigid and/or structural. In some embodiments, outermost-cylindrical-sidewall 255 may extends upwards from an outer periphery of the larger-circular-base 253 that terminates in outermost-cutting-means 257. In some embodiments, outermost-cutting-means 257 may be configured to saw (cut) into a portion of the section of drywall 100 defining an outermost edge (boundary) of annular-rabbet 500. In some embodiments, interior-rabbet-making-means 259 may be attached to at least some of an upper surface of larger-circular-base 253. In some embodiments, interior-rabbet-making-means 259 may be configured for removing the drywall-material within the portion of the section of the drywall 100 to a fixed and a non-variable depth 501 (depth-of-rabbet 501) from (bottom) exterior-surface 600 of the section of the drywall 100. In some embodiments, when tool 200 executes a rotational maneuver of rotating through at least three hundred and sixty (360) degrees around common-rotational-axis of tool 200, a two-dimensional (2D) projected shape of that rotational maneuver in the section of the drywall 100 is an annulus. In some embodiments, outermost-cutting-means 257 of the outermost-cylindrical-sidewall 255 may be a plurality of hole-saw-teeth. In some embodiments, outermost-cutting-means 257 are not configured to form a through-hole in the section of the drywall 100 (because a height of 255 may be too shallow and/or guide-wheel-assemblies 461 may block/limit ingress of outermost-cylindrical-sidewall 255, outermost-cutting-means 257, and/or interior-rabbet-making-means 259 into the drywall-material to depth-of-rabbet 501). See e.g., FIG. 2A through FIG. 5B.

In some embodiments, interior-rabbet-making-means 259 may comprise a plurality of distinct raised fin members, wherein each fin member, selected from the plurality of distinct raised fin members, may extend upwards and orthogonally away from the larger-circular-base 253 that distally terminates in a plurality of saw-teeth. See e.g., FIG. 2A, FIG. 2C through FIG. 2F, FIG. 3, and FIG. 4B.

In some embodiments, interior-rabbet-making-means 259 may comprise a plurality of distinct raised fin members, wherein each fin member, selected from the plurality of distinct raised fin members, has a finite length that is non-linear and/or curved. See e.g., FIG. 2H.

In some embodiments, interior-rabbet-making-means 259 may comprise: a set of innermost-interior-rabbet-making-means 259*a*, a set of middle-interior-rabbet-making-means 259*b*, and a set of outermost-interior-rabbet-making-means 259*c*. In some embodiments, the set of innermost-interior-rabbet-making-means 259*a* may be located closer to hole-saw 201 than to outermost-cylindrical-sidewall 255. In some embodiments, the set of outermost-interior-rabbet-making-means 259*c* may be located closer to outermost-cylindrical-sidewall 255 than to hole-saw 201. In some embodiments, the set of middle-interior-rabbet-making-means 259*b* may be located at least partially between the set of the innermost-interior-rabbet-making-means 259*a* and the set of the outermost-interior-rabbet-making-means 259*c*. See e.g., FIG. 2H.

In some embodiments, the interior-rabbet-making-means 259 and/or 859 may be configured to grind down drywall-material. In some embodiments, interior-rabbet-making-means 259 and/or 859 may comprise an abrasive surface that is configured for grinding away portions of drywall 100. See e.g., FIG. 8.

In some embodiments, tool 200 may comprise a plurality of guide-wheel-assemblies 461. In some embodiments, the plurality of guide-wheel-assemblies 461 may be configured to facilitate rotational spinning of tool 200 about common-rotational-axis 299 of tool 200. In some embodiments, each guide-wheel-assembly 461, selected from the plurality of guide-wheel-assemblies 461, may be attached to a bottom of rabbet-making-means 251 (second-circular-base (largest-circular-base) 253), with a freely rotatable wheeled portion 261 extending beyond an outermost diameter of the rabbet-making-means 251 (second-circular-base (largest-circular-base) 253). In some embodiments, freely rotatable wheeled portion 261 may prevent, block, and/or limited rabbet-making-means 251 (outermost-cylindrical-sidewall 255, outermost-cutting-means 257, and/or interior-rabbet-making-means 259) from extending into the section of the drywall 100 beyond a desired depth 501; when the freely rotatable wheeled portion 261 makes direct physical contact with (bottom) exterior-surface 600 of the section of drywall 100. See e.g., FIG. 2A through FIG. 4B.

In some embodiments, the plurality of guide-wheel-assemblies 461 are equidistant positioned with respect to each other around an outer periphery of the rabbet-making-means 251 (second-circular-base (largest-circular-base) 253). See e.g., FIG. 2G.

In some embodiments, an outermost diameter of rabbet-making-means 251 (e.g., second-circular-base [largest-circular-base] 253 and/or outermost-cylindrical-sidewall 255) and the outermost diameter of hole-saw 201 (e.g., first-circular-base [smaller-circular-base] 203 and/or cylindrical-sidewall 205) may be concentric with respect to each other about common-rotational-axis 299 of tool 200. In some embodiments, the outermost diameter of hole-saw 201 (e.g., first-circular-base [smaller-circular-base] 203 and/or cylindrical-sidewall 205) may be located (entirely) within the outermost diameter of rabbet-making-means 251 (e.g., second-circular-base [largest-circular-base] 253 and/or outermost-cylindrical-sidewall 255). See e.g., FIG. 2A and FIG. 2H.

In some embodiments, hole-saw 201 (e.g., cylindrical-sidewall 205 and/or positioning-drill-bit [centering-drill-bit] 215) is taller than rabbet-making-means 251 (outermost-cylindrical-sidewall 255 and/or interior-rabbet-making-means 259). See e.g., FIG. 2C through FIG. 2F, FIG. 3, and FIG. 4B.

In some embodiments, a height or tallness of cylindrical-sidewall 205 may be taller than a thickness of drywall 100; and a height or tallness of rabbet-making-means 251 (outermost-cylindrical-sidewall 255 and/or interior-rabbet-making-means 259) may be less than the thickness of drywall 100. In some embodiments, the height or tallness of rabbet-making-means 251 (outermost-cylindrical-sidewall 255 and/or interior-rabbet-making-means 259) may be less than half the thickness of drywall 100.

Embodiments of hole-saws-with-annular-rabbet-makers have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A tool that is configured to generate a through-hole in a section of drywall and that is also configured to remove some drywall-material around a circumference of the through-hole that results in an annular rabbet in the section of drywall directly around the through-hole, wherein the tool comprises:

a hole-saw and a rabbet-making-means, wherein at least some of the rabbet-making-means radially surrounds an outermost diameter of the hole-saw;

wherein the hole-saw is configured to generate the through-hole;

wherein the rabbet-making-means is configured to generate the annular rabbet;

wherein the rabbet-making-means comprises:

a larger-circular-base that is larger than a smaller-circular-base of the hole-saw;

an outermost-cylindrical-sidewall that extends upwards from an outer periphery of the larger-circular-base that terminates in an outermost-cutting-means, wherein the outermost-cutting-means is configured to saw into a portion of the section of the drywall defining an outermost edge of the annular rabbet; and interior-rabbet-making-means that is attached to at least some of an upper surface of the larger-circular-base, wherein the interior-rabbet-making-means is configured for removing the drywall-material within the portion of the section of the drywall to a fixed and a non-variable depth from an exterior surface of the section of the drywall;

wherein when the tool executes a rotational maneuver of rotating through at least three hundred and sixty degrees around a common-rotational-axis of the tool, a two-dimensional projected shape of that rotational maneuver in the section of the drywall is an annulus.

2. The tool according to claim 1, wherein the annular rabbet in the section of the drywall is configured to fit a flange of a spackle frame within that annular rabbet.

3. The tool according to claim 2, wherein when the flange of the spackle frame is inlaid within the annular rabbet, a bottom exterior surface of the section of the drywall is flush with at least some of a bottom exterior surface of the flange.

4. The tool according to claim 1, wherein the tool further comprises a collar that is attached to a bottom surface of the rabbet-making-means.

5. The tool according to claim 4, wherein the tool further comprises an arbor, wherein a portion of the arbor is attached to the collar and a different portion of the arbor is configured to be removably attached to a chuck of a drill or of an impact driver.

6. The tool according to claim 5, wherein when the chuck is removably attached to the arbor, the drill or the impact driver provides motive rotational force for the tool to accomplish a rotational maneuver against the section of the drywall, resulting in generation of both the annular rabbet and the through-hole in the section of the drywall.

7. The tool according to claim 1, wherein the outermost-cutting-means of the outermost-cylindrical-sidewall is a plurality of hole-saw-teeth.

8. The tool according to claim 1, wherein the interior-rabbet-making-means comprises a plurality of distinct raised fin members, wherein each fin member, selected from the plurality of distinct raised fin members, extends upwards and orthogonally away from the larger-circular-base that distally terminates in a plurality of saw-teeth.

9. The tool according to claim 1, wherein the interior-rabbet-making-means comprises a plurality of distinct raised fin members, wherein each fin member, selected from the plurality of distinct raised fin members, has a finite length that is non-linear.

10. The tool according to claim 1, wherein the interior-rabbet-making-means comprises: a set of innermost-interior-rabbet-making-means, a set of middle-interior-rabbet-making-means, and a set of outermost-interior-rabbet-making-means.

11. The tool according to claim 10, wherein the set of innermost-interior-rabbet-making-means are located closer to the hole-saw than to the outermost-cylindrical-sidewall.

12. The tool according to claim 10, wherein the set of outermost-interior-rabbet-making-means are located closer to the outermost-cylindrical-sidewall than to the hole-saw.

13. The tool according to claim 10, wherein the set of middle-interior-rabbet-making-means are located at least partially between the set of the innermost-interior-rabbet-making-means and the set of the outermost-interior-rabbet-making-means.

14. The tool according to claim 1, wherein the hole-saw is taller than the rabbet-making-means.

15. A tool that is configured to generate a through-hole in a section of drywall and that is also configured to remove some drywall-material around a circumference of the through-hole that results in an annular rabbet in the section of drywall directly around the through-hole, wherein the tool comprises:

a hole-saw and a rabbet-making-means, wherein at least some of the rabbet-making-means radially surrounds an outermost diameter of the hole-saw; and a plurality of guide-wheel-assemblies that are configured to facilitate rotational spinning of the tool about a common-rotational-axis of the tool, wherein each guide-wheel-assembly, selected from the plurality of guide-wheel-assemblies, is attached to a bottom of the rabbet-making-means, with a freely rotatable wheeled portion extending beyond an outermost diameter of the rabbet-making-means;

wherein the hole-saw is configured to generate the through-hole;

wherein the rabbet-making-means is configured to generate the annular rabbet.

16. The tool according to claim 15, wherein the freely rotatable wheeled portion prevents and blocks the rabbet-making-means from extending into the section of the drywall beyond a desired depth.

17. The tool according to claim 15, wherein the plurality of guide-wheel-assemblies are equidistant positioned with respect to each other around an outer periphery of the rabbet-making-means.

18. A tool that is configured to generate a through-hole in a section of drywall and that is also configured to remove some drywall-material around a circumference of the through-hole that results in an annular rabbet in the section of drywall directly around the through-hole, wherein the tool comprises:

a hole-saw and a rabbet-making-means, wherein at least some of the rabbet-making-means radially surrounds an outermost diameter of the hole-saw;

wherein the hole-saw is configured to generate the through-hole;

wherein the rabbet-making-means is configured to generate the annular rabbet;

wherein an outermost diameter of the rabbet-making-means and the outermost diameter of the hole-saw are concentric with respect to each other about a common-rotational-axis of the tool, wherein the outermost diameter of the hole-saw is located within the outermost diameter of the rabbet-making-means.

19. The tool according to claim 18, wherein the interior-rabbet-making-means is configured to grind down the drywall-material, wherein the interior-rabbet-making-means comprises an abrasive surface that is configured for grinding away portions of drywall.

* * * * *